United States Patent [19]

Udagawa et al.

[11] Patent Number: 5,592,304
[45] Date of Patent: Jan. 7, 1997

[54] IMAGE PROCESSING SYSTEM IN WHICH OVERLAPPING IMAGE DATA IS DELETED FROM A FRAME MEMORY

[75] Inventors: Yutaka Udagawa, Machida; Toshihiko Otsubo, Yokohama; Masahiro Nishio, Tokyo, all of Japan

[73] Assignee: Canon Kabushiki Kaisha, Tokyo, Japan

[21] Appl. No.: 264,256

[22] Filed: Jun. 22, 1994

Related U.S. Application Data

[63] Continuation of Ser. No. 777,636, Oct. 16, 1991, abandoned.

[30] Foreign Application Priority Data

Oct. 17, 1990 [JP] Japan .................. 2-276520

[51] Int. Cl.⁶ .................. H04N 1/21; H04N 1/387
[52] U.S. Cl. .................. 358/444; 358/450; 358/494; 382/284; 382/294; 382/305
[58] Field of Search .................. 358/404, 444, 358/450, 443, 448, 452, 453, 451, 468, 474, 494, 409, 483; 395/115, 116; 382/284, 267, 268, 282, 294, 305

[56] References Cited

U.S. PATENT DOCUMENTS

| | | | |
|---|---|---|---|
| 4,149,090 | 4/1979 | Agulnek | 358/497 |
| 4,636,869 | 1/1987 | Tomohisa et al. | 358/296 |
| 4,675,533 | 6/1987 | Shimizu | 358/448 |
| 4,692,812 | 9/1987 | Hirahara et al. | 358/443 |
| 4,707,615 | 11/1987 | Hosaka | 358/474 |
| 4,734,787 | 3/1988 | Hayashi | 358/494 |
| 4,774,592 | 9/1988 | Suzuki et al. | 358/494 |
| 4,876,612 | 10/1989 | Honma et al. | 358/474 |
| 4,958,236 | 9/1990 | Nagashima et al. | 358/296 |
| 5,036,545 | 7/1991 | Iida et al. | 358/474 |
| 5,134,572 | 7/1992 | Takasaki et al. | 395/135 |
| 5,222,158 | 6/1993 | Takasaki et al. | |

Primary Examiner—Scott A. Rogers
Attorney, Agent, or Firm—Fitzpatrick, Cella, Harper & Scinto

[57] ABSTRACT

The present invention provides a multi-function image processing apparatus including a generating device for generating serial-scanned image data which has an overlap portion and a predetermined width and a writing device for writing the image data generated by the generating device in a state where the overlap portion has been deleted in such a manner that the image data is stored in a memory. The apparatus many also include a reading device for reading image data in such a manner that at least a portion of the image data overlaps when the image data having a predetermined width is, by serial scanning, read from the storage device which stores the image data and a processing device for processing the image data which has been read out.

23 Claims, 27 Drawing Sheets

FILM        PROJECTED IMAGE

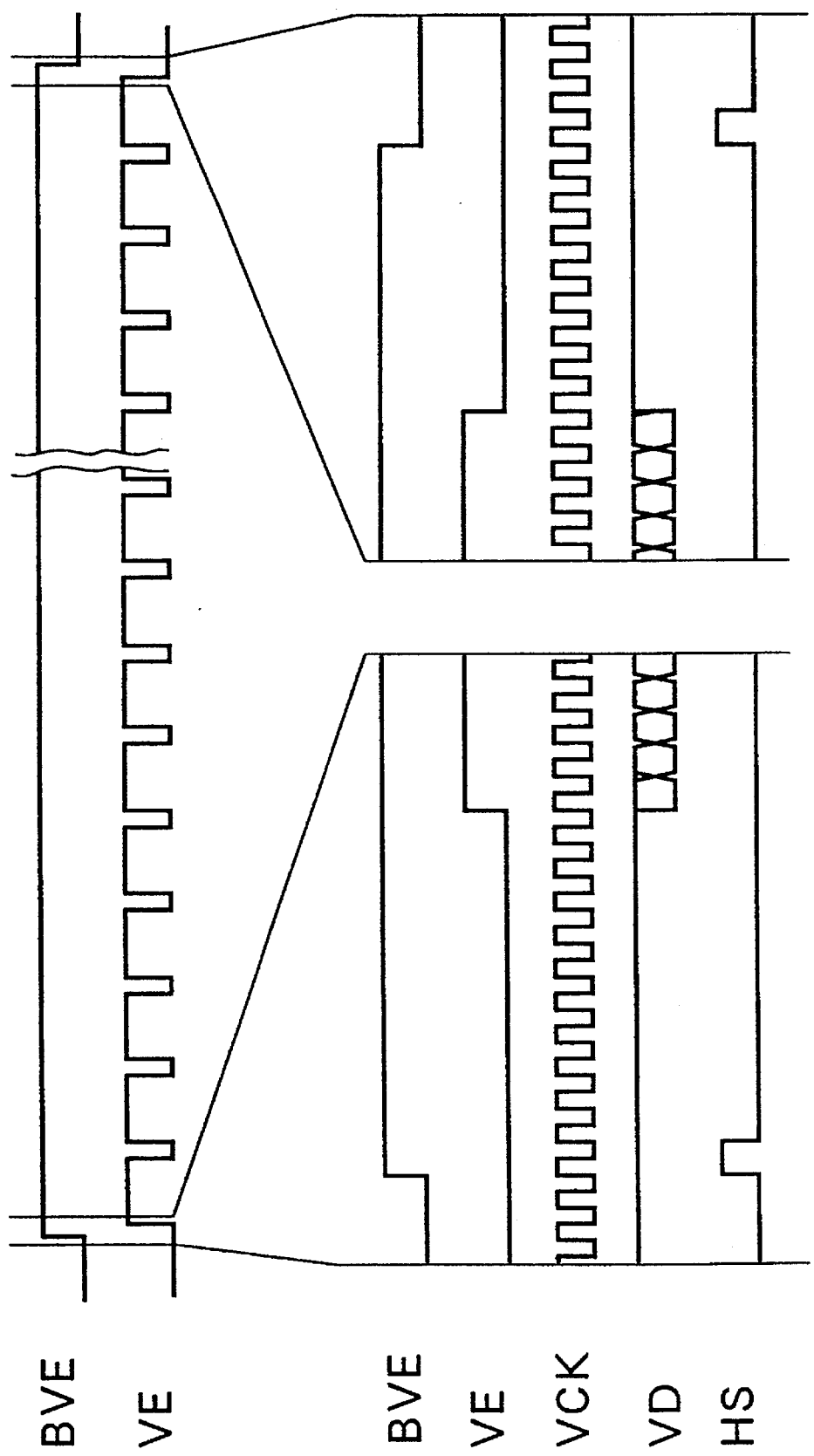

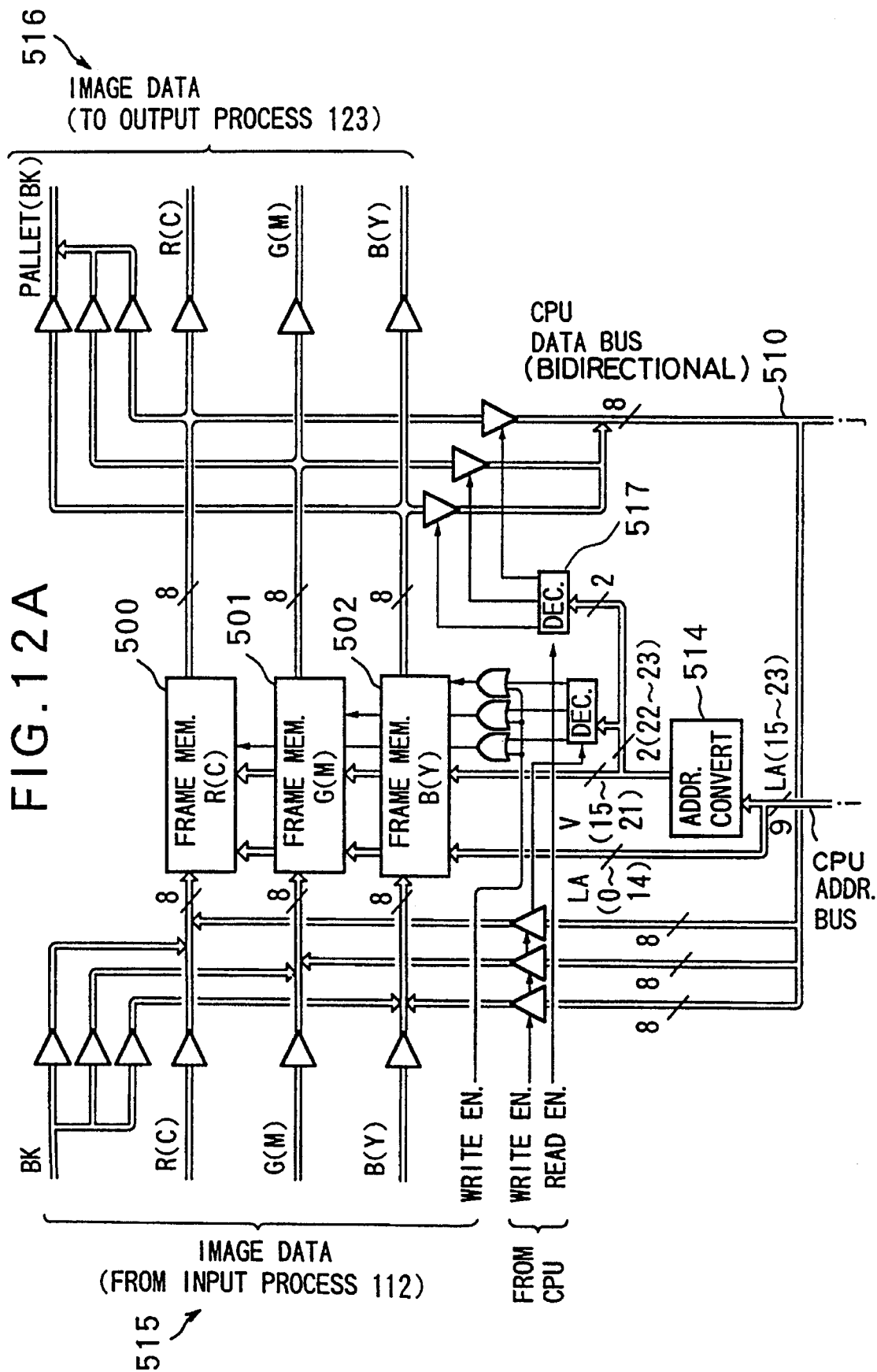

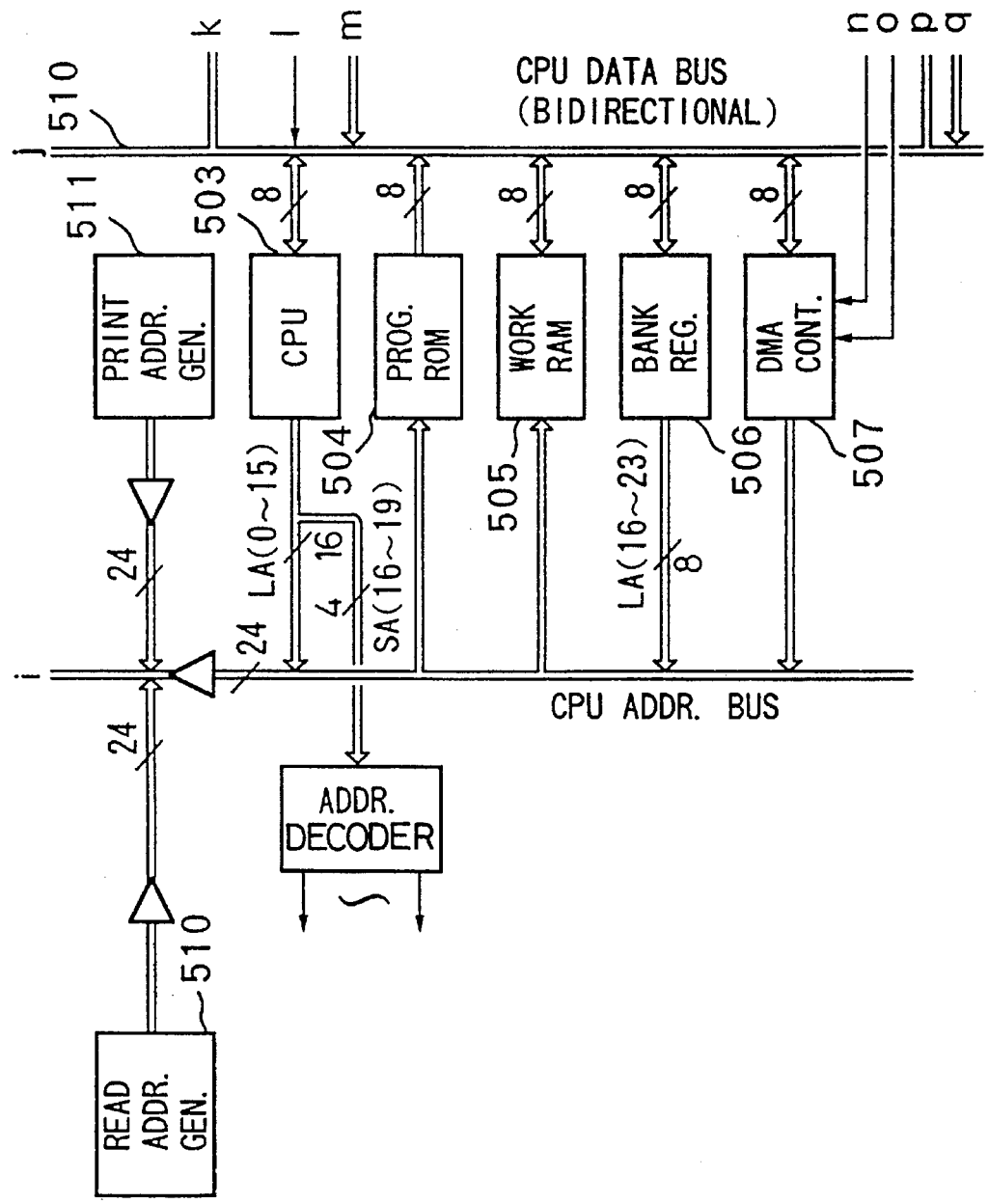

FIG.12C
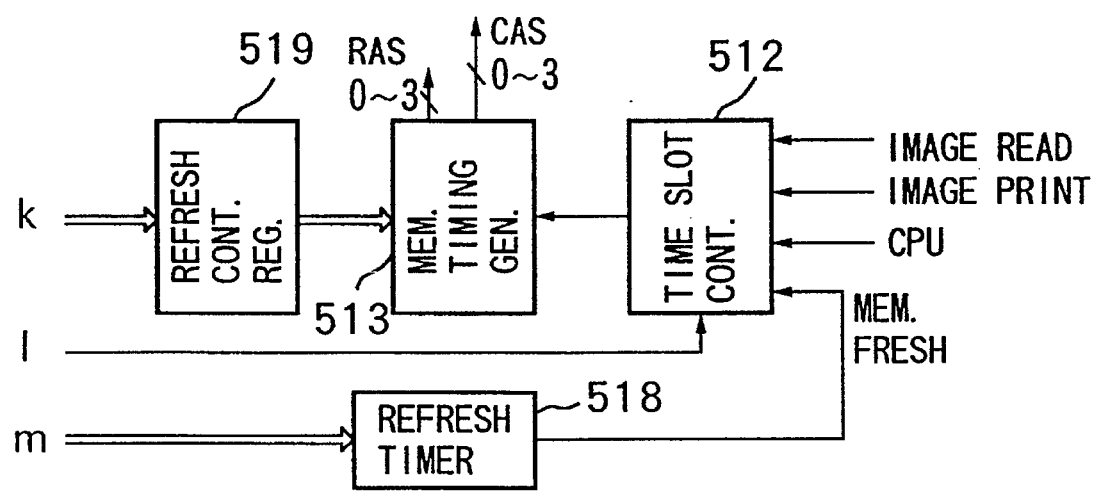
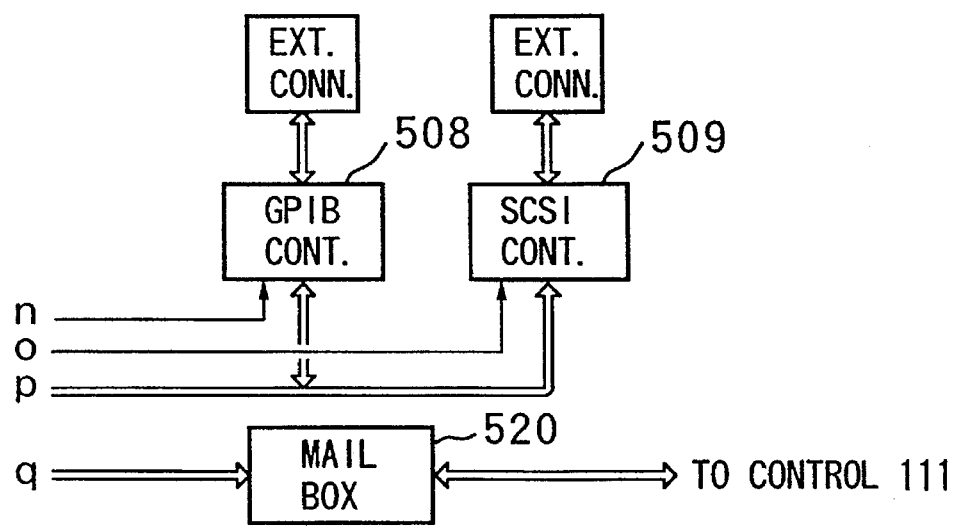

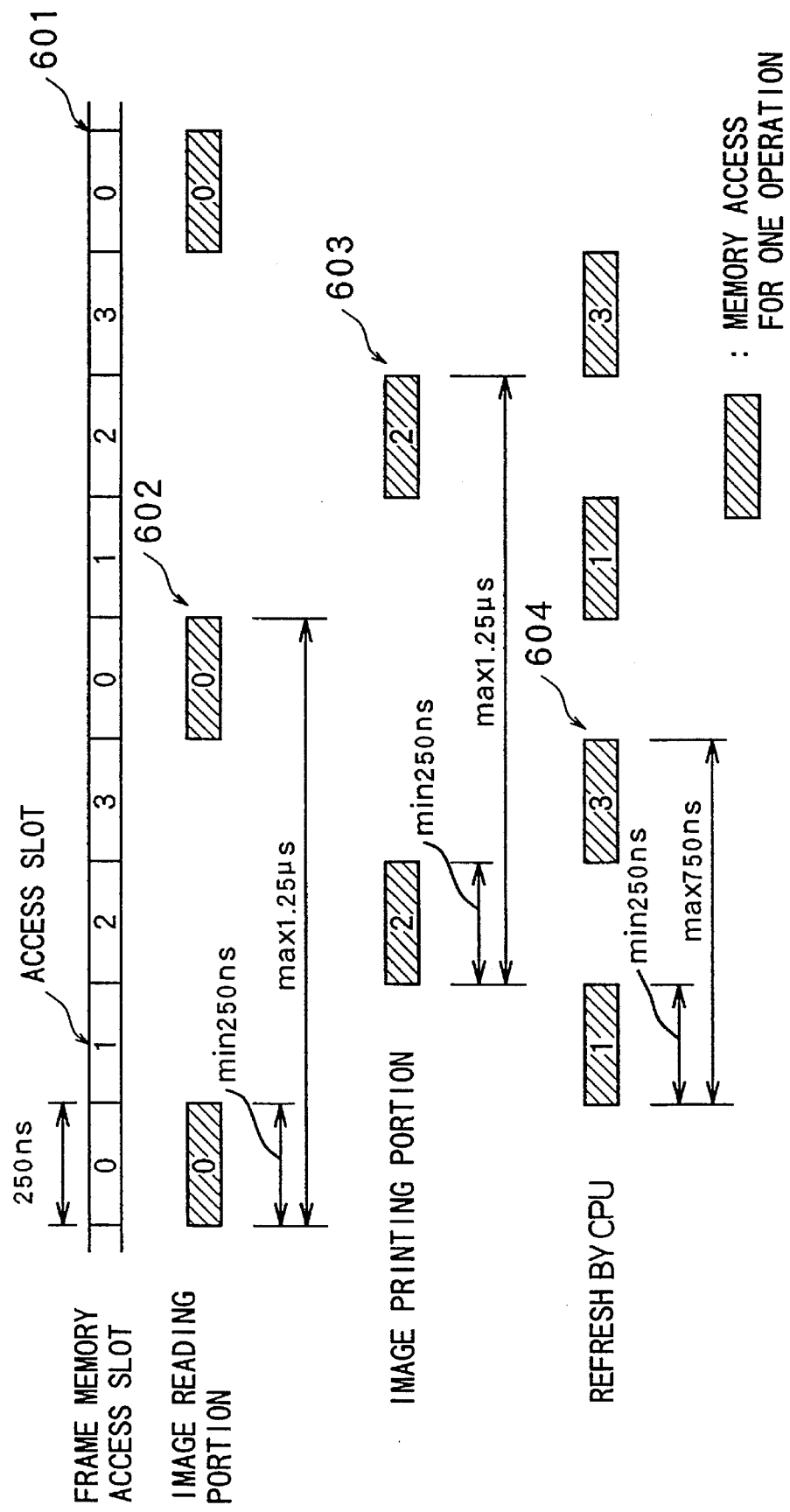

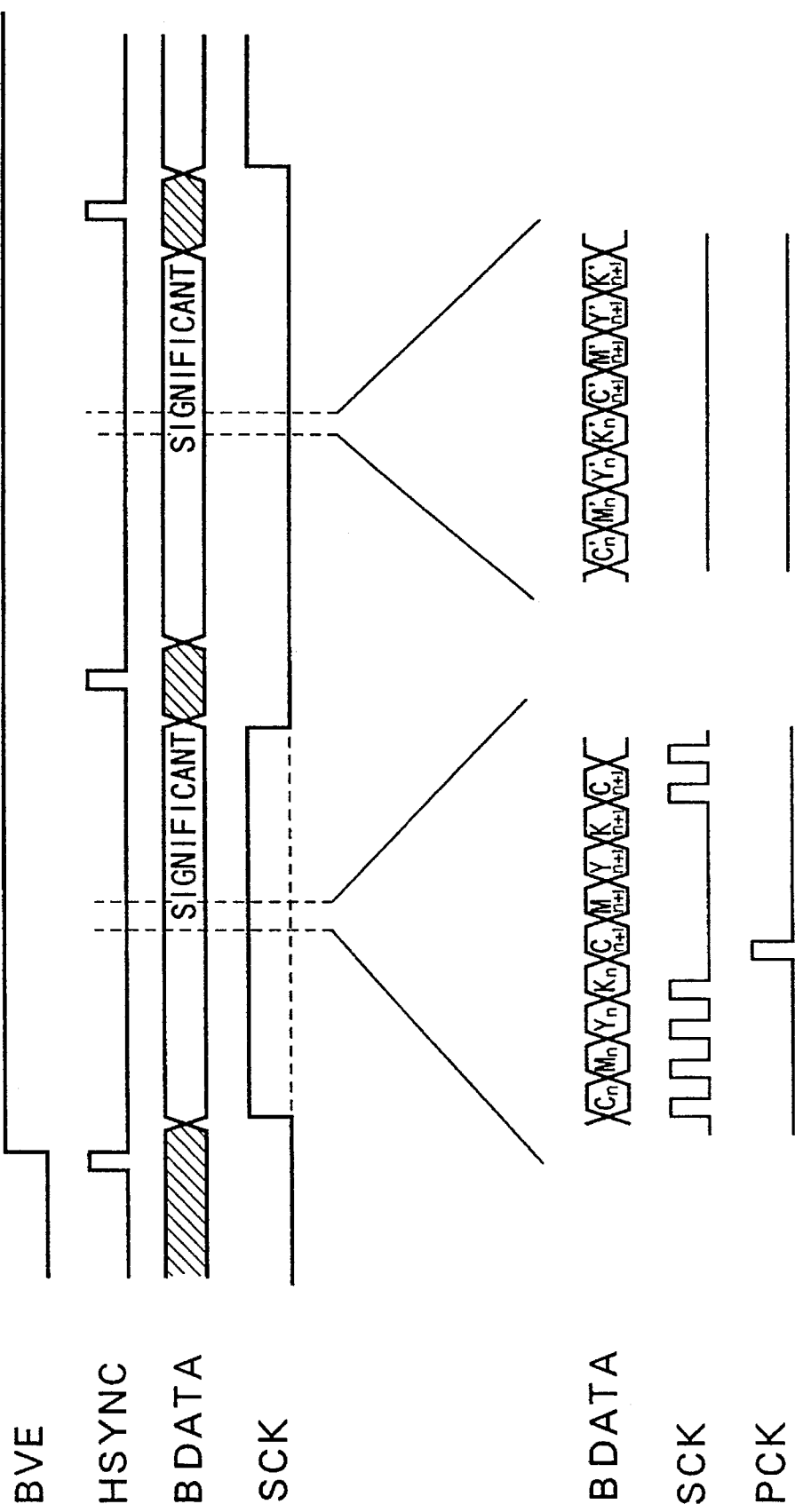

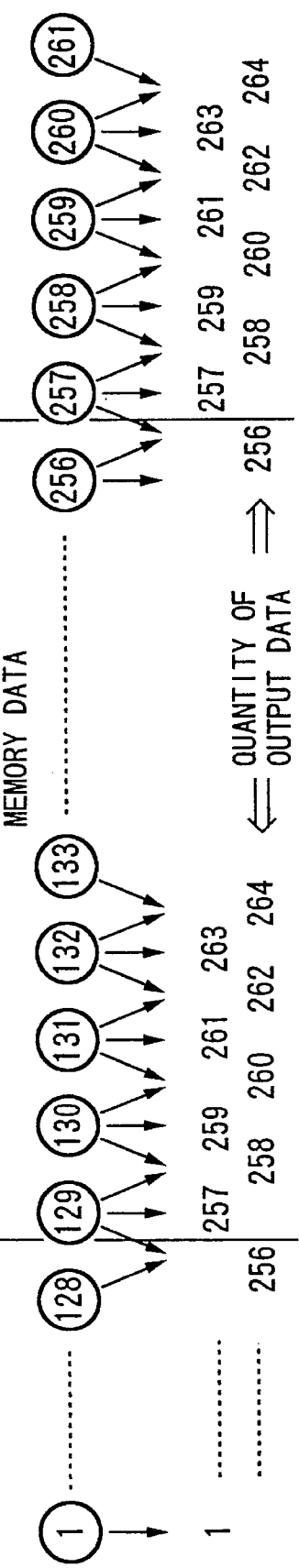

IMAGE PROCESSING SYSTEM IN WHICH OVERLAPPING IMAGE DATA IS DELETED FROM A FRAME MEMORY

This application is a continuation of application Ser. No. 07/777,636 filed Oct. 16, 1991, now abandoned.

BACKGROUND OF THE INVENTION

1. Field of the Invention

The present invention relates to an image processing apparatus for writing/reading an image to and from a memory.

2. Description of the Related Arts

Hitherto, an image processing apparatus has been arranged in such a manner that it reads the R, G and B components of an image in the form of elongated regions by serial scanning operation by using a CCD or the like to binarize them by an error diffusion method or similar method so as to reproduce the image by printing in accordance with binary data thus-obtained. However, there arises a problem in that the quality of the reproduced image deteriorates because the binarization cannot be normally performed at the junction between the elongated regions and thereby undesirable lines or the like are formed. Accordingly, a conventional image reader is arranged to be capable of preventing the generation of the line or the like in such a manner that the above-described junction is read in an overlap manner and and data about the junction is binarized while making a reference to image data about the front portion and the rear portion of the junction.

However, there has been developed an image processing apparatus having a multiplicity of functions such as a function of modifying the original image and a function of synthesizing a plurality of original images as well as the ordinary function of simply copying the original image. In order to realize an image processing apparatus having the above-described multiple functions, the apparatus must comprise an image memory which is capable of temporarily storing the image. However, the image processing apparatus of the above-described type has suffered from a problem taken place in that the quality of the image overlap portion deteriorates when the image is obtained in the form of a print because the overlap image regions are necessarily stored if all of the images read in the overlap manner are written to the image memory. Another problem takes place in that the quality of image deteriorates by the undesirable line or the like because the process of image data read from the image memory prevents the normal completion of the binary operation or the spatial filter operation which is required to process the data about the above-described junction.

SUMMARY OF THE INVENTION

Accordingly, an object of the present invention is to provide an image processing apparatus capable of preventing deterioration in the image quality and having a multiplicity of functions.

In order to achieve the above-described object, according to one aspect of the present invention, there is provided an image processing apparatus comprising: generating means for generating serial-scanned image data which has an overlap portion and a predetermined width; and writing means for writing the image data generated by the generating means in a state where the overlap portion has been deleted in such a manner that the image data is stored in a memory.

According to another aspect of the present invention, there is provided an image processing apparatus comprising: reading means for reading image data in such a manner that at least a portion of the image data overlaps when the image data having a predetermined width is, by serial scanning, read from storage means which stores the image data; and processing means for processing the image data which has been read out. As a result, the deterioration in the image quality can be prevented.

Another object of the present invention is to provide a novel interface apparatus connecting between various devices, e.g., image scanner, printer and image store etc.

Other and further objects, features and advantages of the invention will be appear more fully from the following description.

BRIEF DESCRIPTION OF THE DRAWINGS

FIG. 10 is a timing chart which illustrates the operational timing of the blocks shown in FIG. 1;

FIGS. 12A 12B and 12C illustrate the detailed structure of a frame memory and a control portion;

FIG. 15 is a timing chart which illustrates an access to a frame memory;

FIG. 17 illustrates an example of an operation performed in the input image data processing portion;

FIGS. 19 and 20 illustrate an example of a magnification variation interpolation;

DESCRIPTION OF THE PREFERRED EMBODIMENTS

An embodiment of the present invention will now be described with reference to the drawings. According to this embodiment, an image forming apparatus arranged to act in accordance with the ink jet recording method is described, the image forming apparatus having an ink jet recording type multi-head having a multi-nozzle composed of a plurality of nozzles for discharging ink.

<Functional Blocks>

Figure 1A:
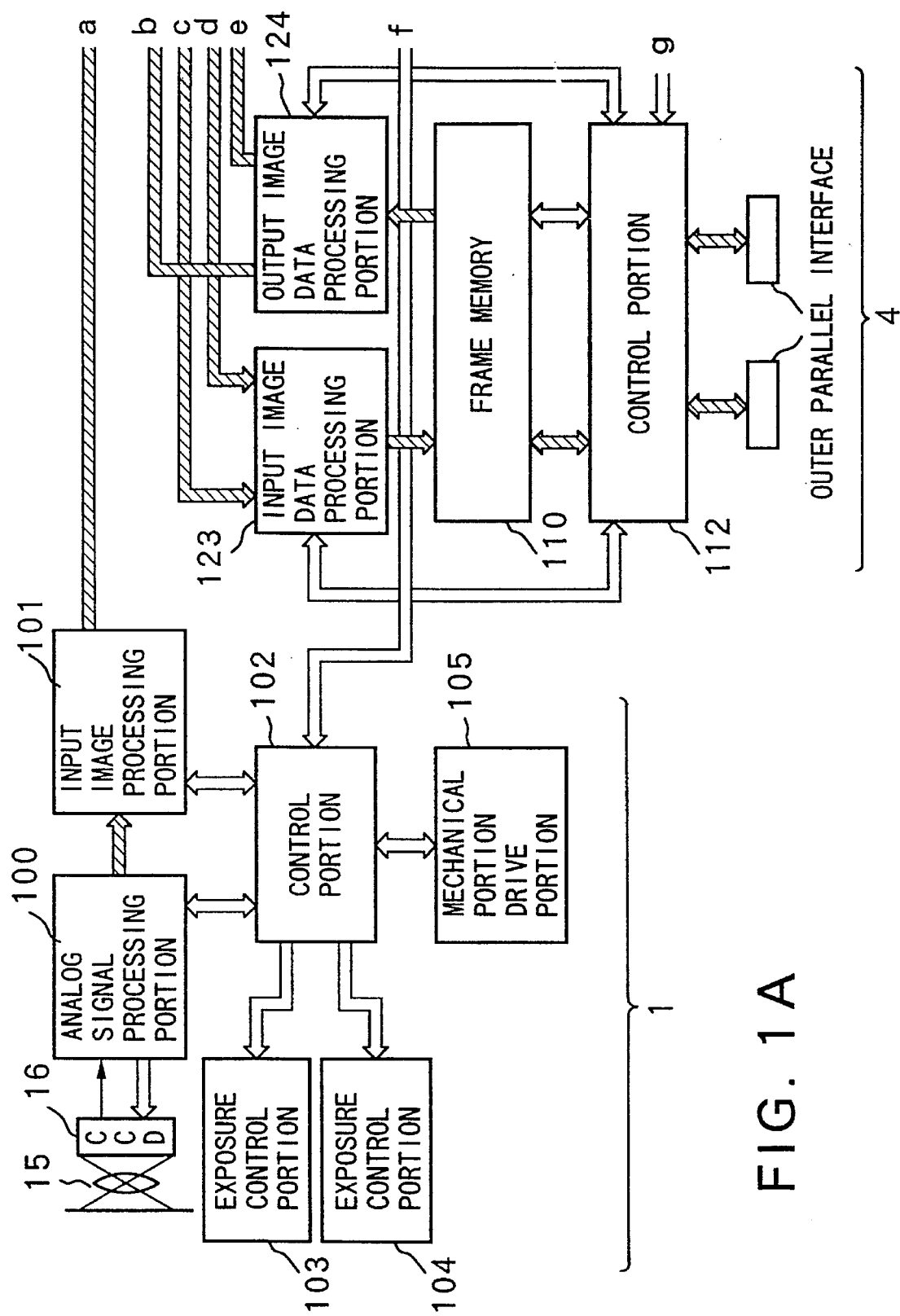
FIGS. 1A and 1B are a functional block diagram which illustrates an embodiment of a digital color copying machine according to the present invention.
Figure 1B:
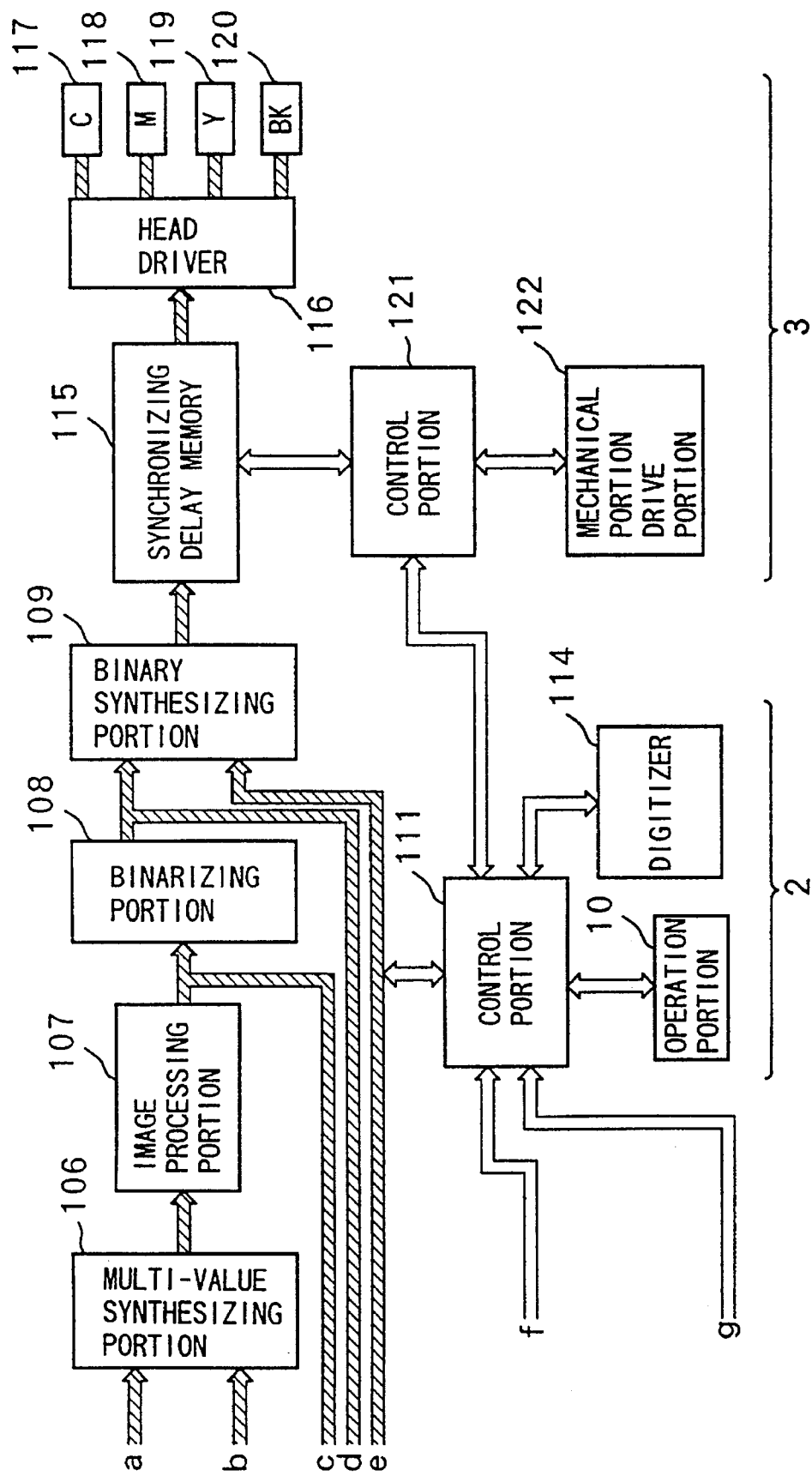

FIG. 1 is a functional block diagram which illustrates the structure of an embodiment of a digital color copying machine according to the present invention.

Referring to FIG. 1, control portions 102, 111, 121 and 112 are control circuits which respectively control a scanner portion 1, a controller portion 2, a printer portion 3 and a frame memory control portion 4 and each of which comprises a microcomputer, a program ROM, a data memory and a communication circuit. The portion between the control portions 102 and 111, between the control portions 111 and 121 and between the control portions 112 and 111 are respectively connected to one another other by communication lines. When the digital color copying machine acts as a color copying machine, a master-slave control mode is employed in which the control portions 102, 121 and 112 are operated in accordance with an instruction issued from the control portion 111.

In a remote mode (to be described later) in which a variety of operations are performed in accordance with commands issued from a host computer (omitted from illustration) via an external parallel interface, the control portion 112 serves as a master which issues a variety of commands to the control portion 111. The control portion 111 is brought into a status in which it issues commands to the control portions 102 and 121 in accordance with the above-described commands issued from the control portion 112. The operation of switching over to the remote mode is realized in accordance with an instruction issued from the above-described host computer or in accordance with an operation of a key switch provided for the operation portion 10.

Figure 7:
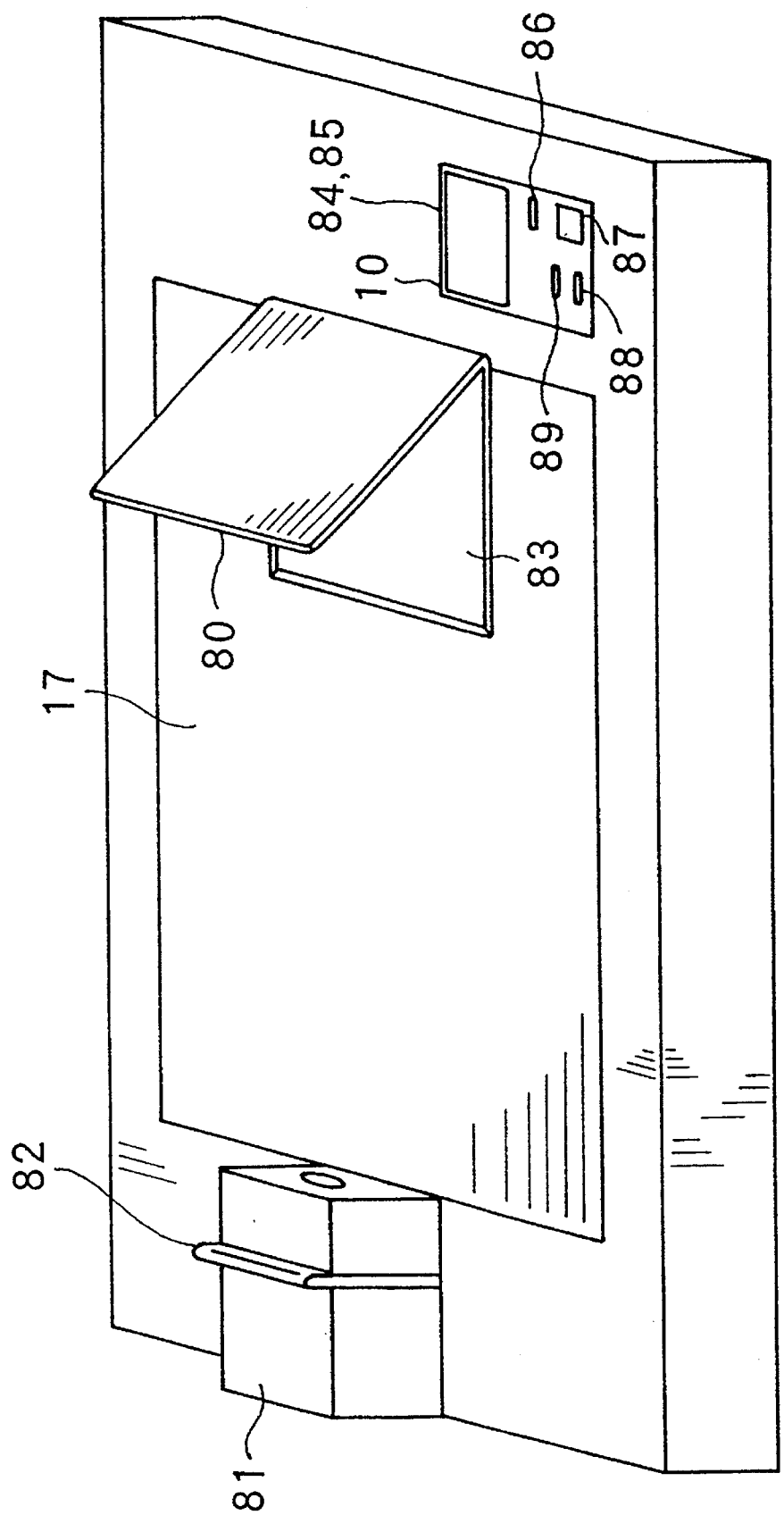
FIGS. 7 to 9 illustrate another example of the scanner portion.

The control portion 111 acts in accordance with instructions supplied through the operation portion 10 or a digitizer 114 in a case where the control portion 111 acts as a color copying machine. As shown in FIG. 7, the operation portion 10 has a display portion formed by, for example, liquid crystal (an LCD display portion 84) and a touch panel 85 composed of transparent electrodes on the surface thereof so that selections/instructions such as an instruction of color, an instruction of an editing operation and the like can be made. Furthermore, the following keys concerning the operations are individually disposed: a start key 87 with which the commencement of the copying operation is instructed; a stop key 88 with which the stop of the copying operation is instructed; a reset key 89 for returning the operational mode to a standard state; a projector key 86 with which a projector is selected; and the like. The digitizer 114 is provided for the purpose of supplying positional information required to perform trimming, masking or the like, the digitizer 114 being, as an option, connected to the apparatus in a case where a complicated editing operation is required. Furthermore, the control portion 111 controls a multi-value synthesizing portion 106 for processing a variety of data items about the image, an image processing portion 107, a binarizing portion 108 and a binary synthesizing portion 109.

The control portion 102 controls the following control portions: a mechanism drive portion 105 for controlling the operation of the mechanism of the scanning portion 1; an exposure control portion 103 for controlling exposure of a lamp at the time of reading a reflected image of an original document; and an exposure control portion 104 for controlling exposure of a halogen lamp 90 at the time of using a projector. The control portion 102 also controls an analog signal processing portion 100 for processing a variety of data items about the image and an input image processing portion 101.

The control portion 121 controls the following elements: a mechanism drive portion 105 for controlling the operation of a mechanical portion of a printer portion 3; and a synchronization/delay memory 115 for absorbing deviation in terms of time in the operation of the mechanical portion of the printer 3 and correcting a delay taken place due to the mechanical arrangement of recording heads 117 to 120.

Then, the image processing blocks shown in FIG. 1 will now be described with reference to a flow of processing of an image.

An image formed on a CCD 16 is converted into an analog electric signal by the CCD 16. Image information thus-converted is serially processed in an order from red, green to blue before the result of this serial operation is supplied to an analog signal processing portion 100. The analog signal processing portion 100 performs operations such as sampling/holding operations, a collection of the dark level and the control of the dynamic range before it performs an analog-to-digital conversion (A/D conversion), and then the analog signal processing portion 100 converts the result of the A/D conversion into a serial multi-value digital image signal (according to this embodiment, each color has a length corresponding to 8 bits) which is then transmitted to the input image processing portion 101. In the image processing portion 101, correction operations such as a CCD correction, a γ correction and the like required for the reading system are performed while directly using the above-described serial multi-value digital image signal.

The multi-value synthesizing portion 106 of the control portion 2 is a circuit block for selecting/synthesizing the serial multi-value digital image signal transmitted from the scanner portion 1 and another serial multi-value digital image signal transmitted from the frame memory 110. Selected/synthesized image data is, in the form of the multi-value digital image signal as it is, supplied to the image processing portion 107. The image processing portion 107 is a circuit for performing a smoothing operation, an edge exaggerating operation, a black extracting operation and a masking operation for the purpose of correcting the color of recording ink to be used in the recording heads 117 to 120. In the image processing portion 107, such operation is performed that a value of interested pixel is decided with the data of surrounding pixels being used.

The output in the form of the serial multi-value digital image signal is supplied to the binarizing portion 108 and the frame memory 110. The binarizing portion 108 is a circuit for binarizing the serial multi-value digital image signal and arranged to be capable of selecting a simple binarizing operation to be performed in accordance with a fixed slice level or a pseudo-halftone process to be performed in accordance with the error diffusion method or the like. In the binarizing portion 108, the serial multi-value digital image signal is converted into binary parallel image signals which denote four colors. The binary synthesizing portion 109 receives image data which denotes the four colors, while the frame memory 110 receives image data which denotes three colors. The binary synthesizing portion 109 selects/synthesizes the binary parallel image signal transmitted from the frame memory 110 and denoting the three or four colors and the binary parallel signal transmitted from the binarizing portion 108 and denoting the four colors so as to form a binary parallel image signal which denotes the four colors.

The control portion 112 of the frame memory control portion 4 controls the frame memory 110 so as to transmit image data stored in the frame memory 110 to a predetermined synthesizing position by arranging timing with the above-described multi-value synthesizing portion 106 and the binary synthesizing portion 109. The control portion 112 also writes, to the frame memory, an original document image supplied from the scanner portion 1 in the from of a multi-value signal, as it is via the image processing portion 107, or in the form of a binary signal via the binarizing portion 108. The input image processing portion 123, as described later in detail, determines the region for image data to be received in accordance with an instruction issued from the control portion 112 before performing reduction operation or the like. All methods in which the data of interested pixel is binarized with the data of surrounding pixels being used are useful in the binarizing portion 108 of the present invention. The input image processing portion 123 then transmits image data to the frame memory 110. Also the output image data processing portion 124 performs an enlargement process, a logarithmic conversion and pallet conversion operations in accordance with an instruction issued from the control portion 112 as similarly described later. The control portion 112 also controls a general-purpose parallel interface such as a so-called a GPIB interface or an SCSI interface, for example, an $IE^3$-488. As a result, input and output of image data to and from a host computer or a remote control operation by the host computer can be performed through the above-described interface.

The synchronization/delay memory 115 of the printer portion 3 is a circuit for absorbing the time deviation of the mechanical operation of the printer portion 3 and correcting the delay due to the mechanical arrangement of the recording heads 117 to 120. The inside portion of the synchronization/delay memory 115 generates timing required to drive the recording heads 117 to 120. A head driver 116 is an analog drive circuit for driving the recording heads 117 to 120 and generates in the inside portion thereof signals capable of directly driving the recording heads 117 to 120. The recording heads 117 to 120 respective discharge cyan, magenta, yellow and black ink so that an image is formed on a recording sheet.

<Operation of the Elements>

Figure 2:
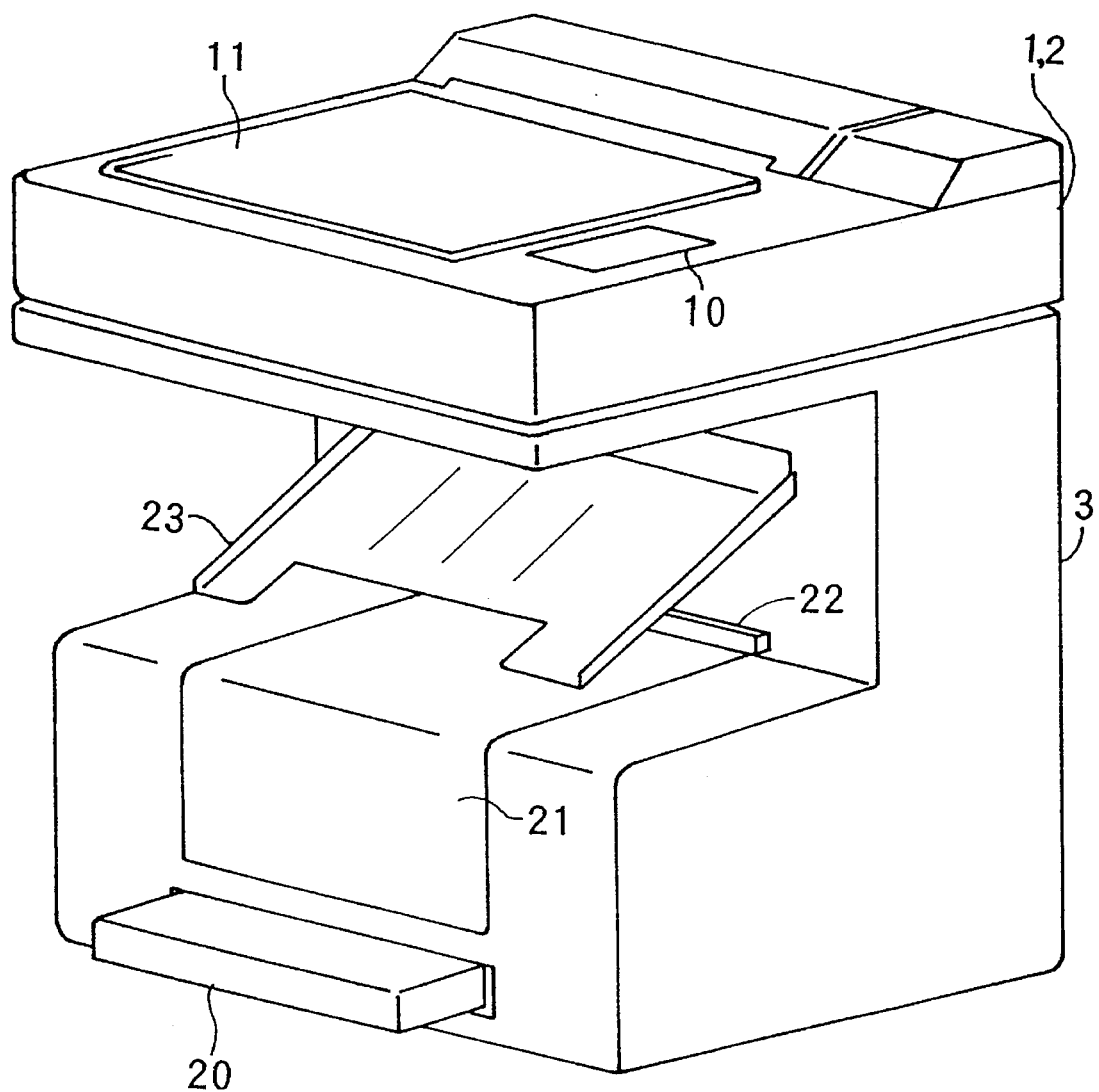
FIG. 2 illustrates the appearance of the digital color copying machine according to the embodiment of the present invention.

FIG. 2 illustrates the appearance of the digital color copying machine to which this embodiment is applied. This overall structure of the digital color copying machine can be divided into two sections.

The upper portion of FIG. 2 is composed of a color image scanner portion 1 (the above-described scanner portion 1) for reading an original image and transmitting a digital color image data and the controller portion 2 included in the scanner portion 1, arranged to subject digital color image data to various image processing operations and having a function of processing the interface or the like which is connected to external equipment. The scanner portion 1 also includes a mechanism for reading a large size sheet-like original document as well as reading a solid original placed downwards below an original document retainer 11 and a sheet-like original document. Furthermore, the operation portion 10 is connected to the controller portion 2 so as to input a variety of information items for the copying machine. The controller portion 2 issues instructions about operations to the scanner portion 1 or the printer portion 3 in accordance with supplied information. In a case where a complicated editing operation is required, a digitizer or the like is installed in place of the original document retainer 1, the digitizer or the like being connected to the controller portion 2 so that an advanced operation can be performed.

The lower portion of FIG. 2 is a printer portion 3 for recording the color digital image signal transmitted from the controller portion 2 on the recording sheet. According to this embodiment, the printer portion 3 is a full-color ink jet printer having a recording head arranged to act in accordance with the ink jet recording method.

The above-described two sections can be separated from each other and as well as they can be placed at two distant portions by extending the connection cable.

(Printer Portion )

Figure 3:
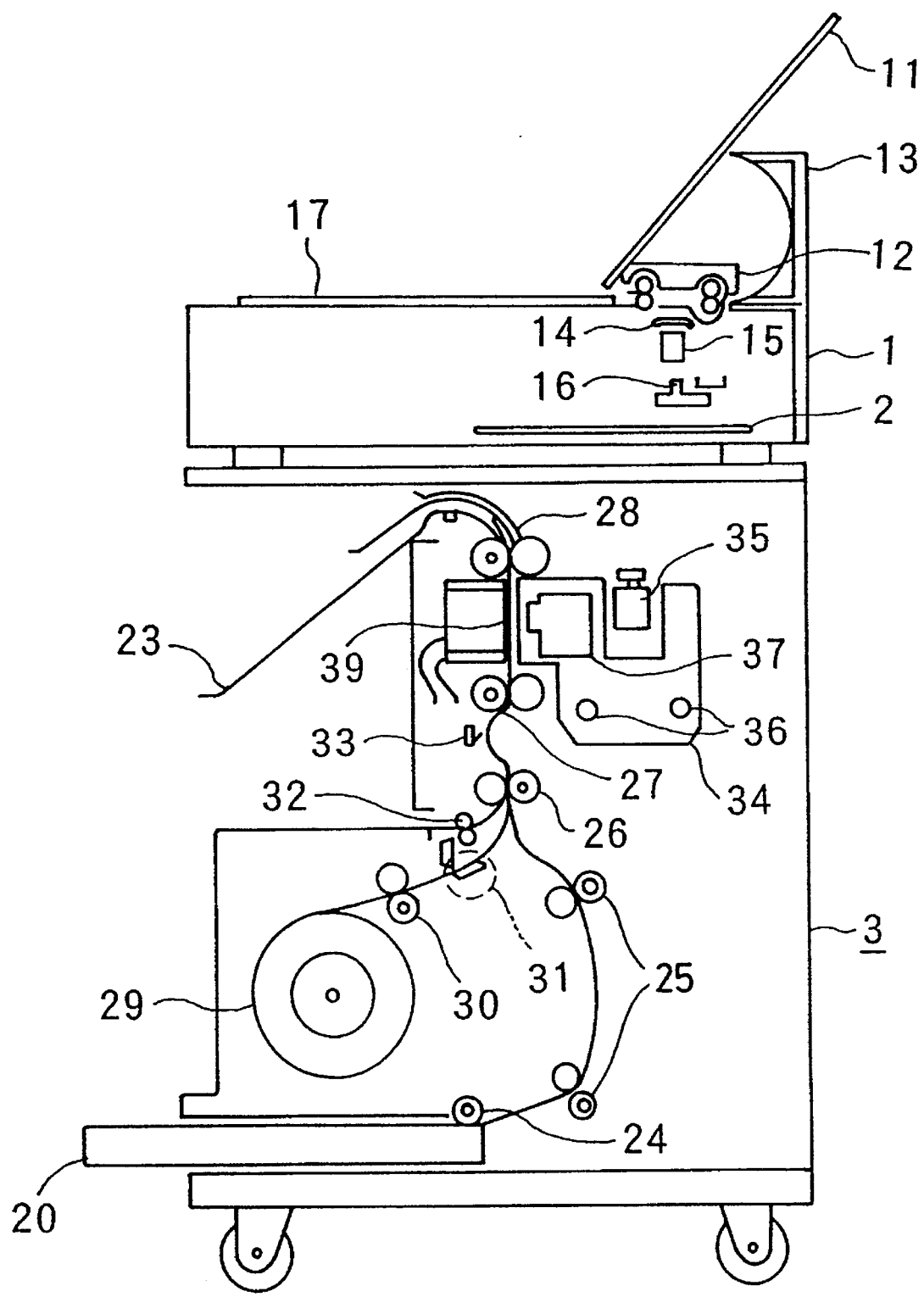
FIG. 3 is a side cross sectional view which illustrates the digital color copying machine according to the embodiment of the present invention.

FIG. 3 is a side cross sectional view which illustrates the digital color copying machine shown in FIG. 2.

First, an exposure lamp 14, a lens 15 and an image sensor 16 (the CCD is used according to this embodiment) capable of reading a line image in a full color manner act to read an original document image placed on an original document frame glass 17, an image projected by a projector or a sheet-shape original document image conveyed by a sheet conveyance mechanism 12. Then, a variety of image processing operations are performed in the scanner portion 1 and the controller portion 2 before the image is recorded on the recording sheet by the printer portion 3.

Referring to FIG. 3, recording sheets are supplied from a paper supply cassette 20 which accommodates a small type regulated size (A4 to A3 size according to this embodiment) cut paper sheets or a roll sheet 29 for recording a large size image (A2 to A1 size according to this embodiment). Furthermore, paper supply from the outside of the apparatus, that is, the manual paper supply can be performed by introducing the recording sheets one by one through a manual feeding port 22 shown in FIG. 2 along a supply portion cover 21.

A pickup roller 24 is a roller for supplying the cut sheets one by one through the paper supply cassette 20. The supplied cut sheet is conveyed to a first paper supply roller 26 by a cut sheet conveyance roller 25. The roll sheet 29 is transmitted by the roll sheet supply roller 30 before it is cut into a sheet having a predetermined length so as to be conveyed to the first paper supply roller 26. Similarly, the recording sheet inserted through the manual feeding port 22 is conveyed to the first paper supply roller 26 by a manual feeding roller 32. The pickup roller 24, the cut sheet conveyance roller 25, the roll sheet supply roller 30, the first paper-supply roller 26 and the manual feeding roller 32 are driven by a paper supply motor (a DC servo motor is used according to this embodiment) in such a manner that they can be turned on/off at any time by an action of an electromagnetic clutch provided for each roller.

When the printing operation is commenced in accordance with an instruction issued from the controller portion 2, the recording paper selectively supplied from any of the above-described paper supply route is conveyed to the first paper-supply roller 26. In order to prevent an undesirable diagonal movement of the recording paper, a paper loop having a predetermined size is formed before the first paper-supply roller 26 is turned on, causing the recording paper to be conveyed to the second paper-supply roller 27. A buffer formed by loosening the recording paper by a predetermined length is placed between the first paper-supply roller 26 and the second paper-supply roller 27 in order to accurately convey the paper between the paper conveyance roller 28 and the second paper supply roller 27. A buffer quantity detection sensor 33 detects the size of the buffer thus-formed. By forming the buffer at an intermediate portion of the paper conveyance route as described above, the undesirable load acting on the paper conveyance roller 28 and the second paper-supply roller 27 in a case where, in particular, a large size recording paper is conveyed can be reduced. Therefore, the recording paper can be accurately supplied.

When an image is printed by the action of a recording head 37, a scanning carriage 34 to which the recording head 37 or the like is installed reciprocates on a carriage rail 36 by a scanning motor 35. In the forward scanning operation, an image is printed on the recording paper, while the recording paper is conveyed by a predetermined distance by the paper conveyance roller 28. At this time, a control is performed in such a manner that a predetermined quantity of the buffer is always made while detecting the above-described drive systems by the paper supply motor. The recording paper which has been printed is exhausted to a paper exhaust tray 23. Thus, the printing operation is completed.

The scanning carriage 34 will now be described in detail with reference to FIG. 4.

Figure 4:
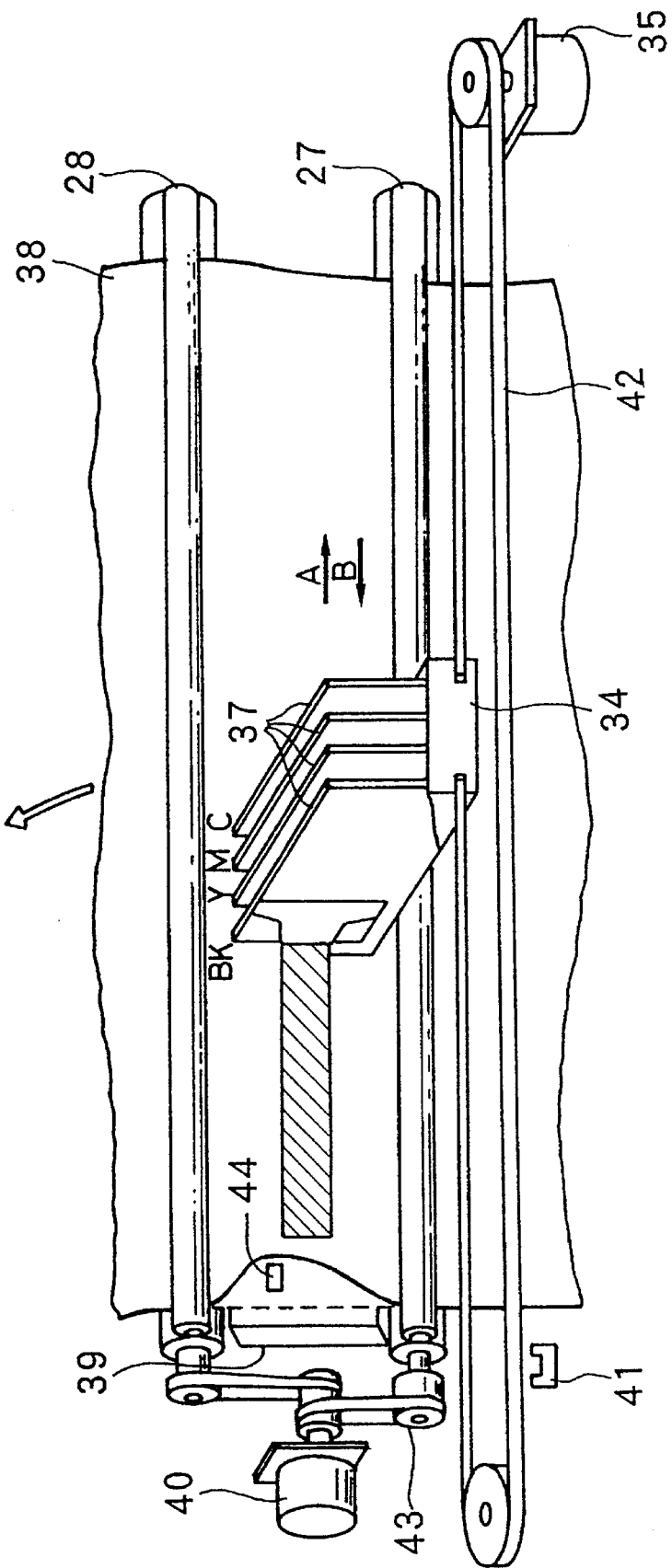
FIG. 4 illustrates the structure of an operational carriage.

Referring to FIG. 4, a paper conveyance motor 40 is a drive source for intermittently conveying the recording paper in such a manner that it drives the second paper supply roller 27 via the paper conveyance roller 28 and a second paper supply roller clutch 43. The scanning motor 35 is a drive source for moving the scanning carriage 34 in directions designated by arrows A and B via a scanning belt 34 to perform a scanning operation. According to this embodiment, the paper conveyance motor 40 and the scanning motor respectively comprise pulse motors because an accurate paper conveyance must be realized.

When the recording paper reaches the second paper supply roller 27, the second paper supply roller clutch 43 and the paper conveyance motor 40 are turned on so that the recording paper is conveyed on a platen 39 to the paper conveyance roller 28. The recording paper is detected by a paper detection sensor 44 disposed on the platen 39 so that information obtained by the sensor 44 is utilized to perform a position control operation and a jam prevention operation. When the recording paper reaches the paper conveyance roller 28, the second paper-supply roller clutch 43 and the paper conveyance motor 40 are turned off so that a paper absorption operation is performed from the inside of the platen 39 in order to bring the recording paper into contact with the surface of the platen in a hermetical manner.

The scanning carriage 34 is moved to a position of a home position sensor 41 prior to performing the operation for recording an image to the recording paper before the scanning carriage is moved forwards in the direction designated by arrow A. As a result, cyan, magenta, yellow and black ink is discharged from the recording head 37 to a predetermined position so that an image is recorded. After an image of a predetermined length has been recorded, the scanning carriage 34 is stopped. Then, a forward scanning operation in the direction designated by arrow B is commenced and the scanning carriage 34 is returned to the position of the home position sensor 41. During the forward scanning operation, the paper conveyance by a length corresponding the quantity of data recorded by the recording head 37 is made in the direction designated by an arrow C by driving the paper conveyance roller 28 by the paper conveyance motor 40.

According to this embodiment, the recording head 37 is an ink jet nozzle which discharges ink droplets by utilizing pressure generated by bubbles formed by heat. The recording head 37 comprises four ink jet nozzles in each of which 256 nozzles are assembled.

When the scanning carriage 34 is stopped at the home position detected by the home position sensor 41, an operation of recovering the recording head 37 is performed in order to stably perform the recording operation. The above-described operation is arranged in such a manner that an operation of applying pressure to the recording head 37, an operation of idle discharging of ink or the like are performed in accordance with previously programmed conditions such as paper supply duration time, temperature in the apparatus, discharge duration time or the like in order to prevent irregularity generated due to change in the viscosity of ink left in the nozzle of the recording head 37. The ink is deposited by film boiling created by heat energy.

According to this embodiment, an image is recorded to the entire surface of the recording paper by repeating the above-described serial printing operation of a predetermined width.

(Scanner portion)

Then, the operation of the scanner portion 1 will now be described with reference to FIGS. 5 and 6.

Figure 5:
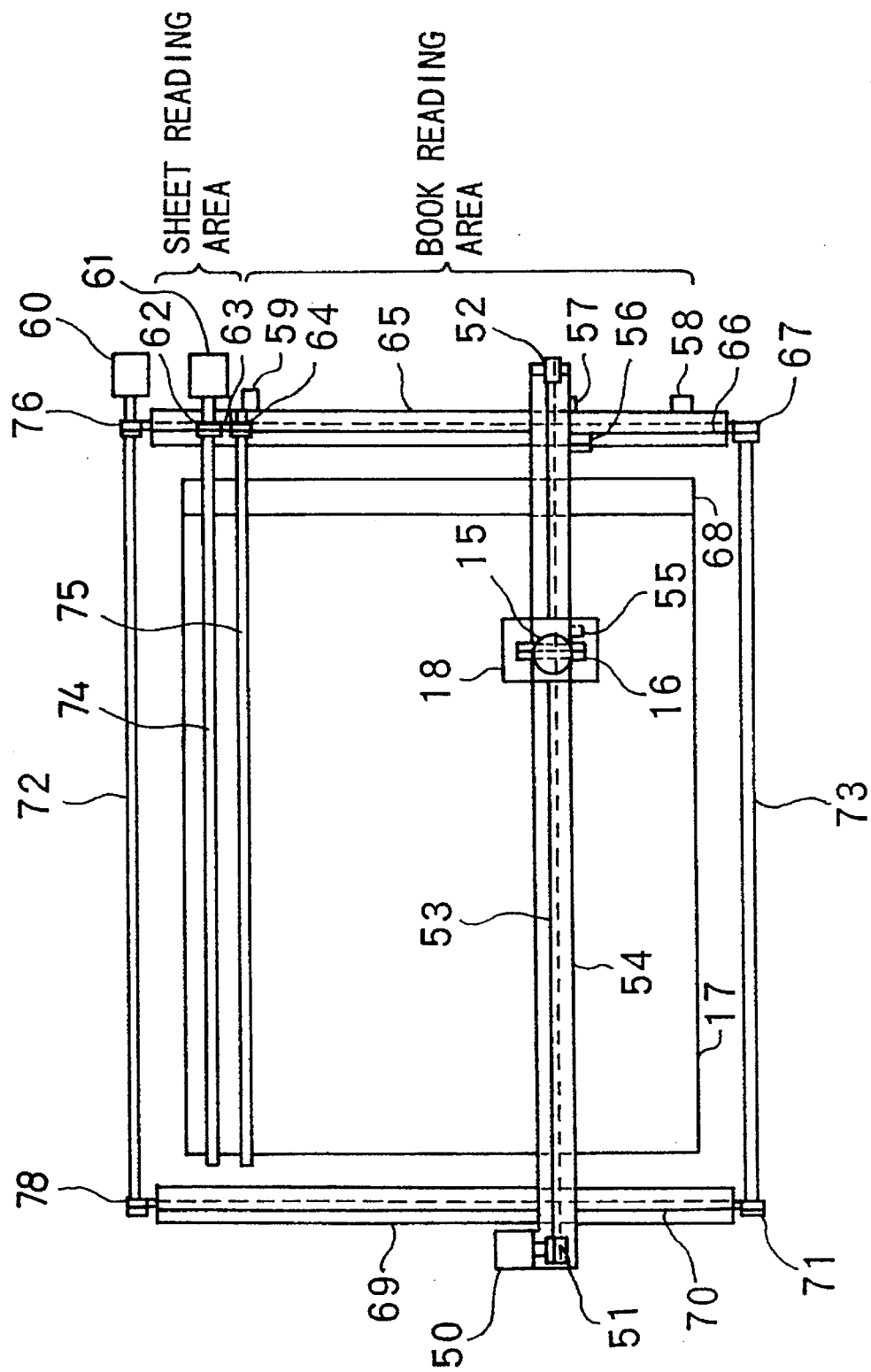
FIGS. 5 and 6 illustrate the structure of a scanner portion.

FIG. 5 illustrates the mechanical structure in the scanner portion 1.

A CCD unit 18 is a unit comprising the CCD 16 and the lens 15 and arranged to move on a rail 54 by a main scanning directional drive system composed of a main scanning motor 50 fixed on the rail 54, pulleys 51 and 52 and a wire 53 so as to read an image on the original document frame glass 17 in the main scanning direction. A light shield plate 55 and a home position sensor 56 are used to perform a positional control required to be performed when the CCD unit 18 is moved to the home position for the main scanning operation in a correction area 68 shown in FIG. 5.

The rail 54 is placed on rails 65 and 69 so as to be moved by a sub-scanning directional drive system composed of sub-scanning motor 60, pulleys 67, 78, 71 and 76, shafts 72 and 73 and wires 66 and 70. The light shield plate 57 and the home position sensors 58 and 59 are used to perform the positional control to be performed to move the rail 54 to the sub-scanning home position in a book mode in which an original document such as a book placed on the original document frame glass 17 or in a sheet mode in which a sheet-like original document is read.

A sheet conveyance motor 61, sheet conveyance rollers 74 and 75, pulleys 62 and 64 and a wire 63 constitute a mechanism for conveying a sheet-like original document. The mechanism thus-constituted acts to move a sheet-like original document downwards placed on the original document frame glass 17 by a predetermined distance by the sheet conveyance rollers 74 and 75.

Figure 6:
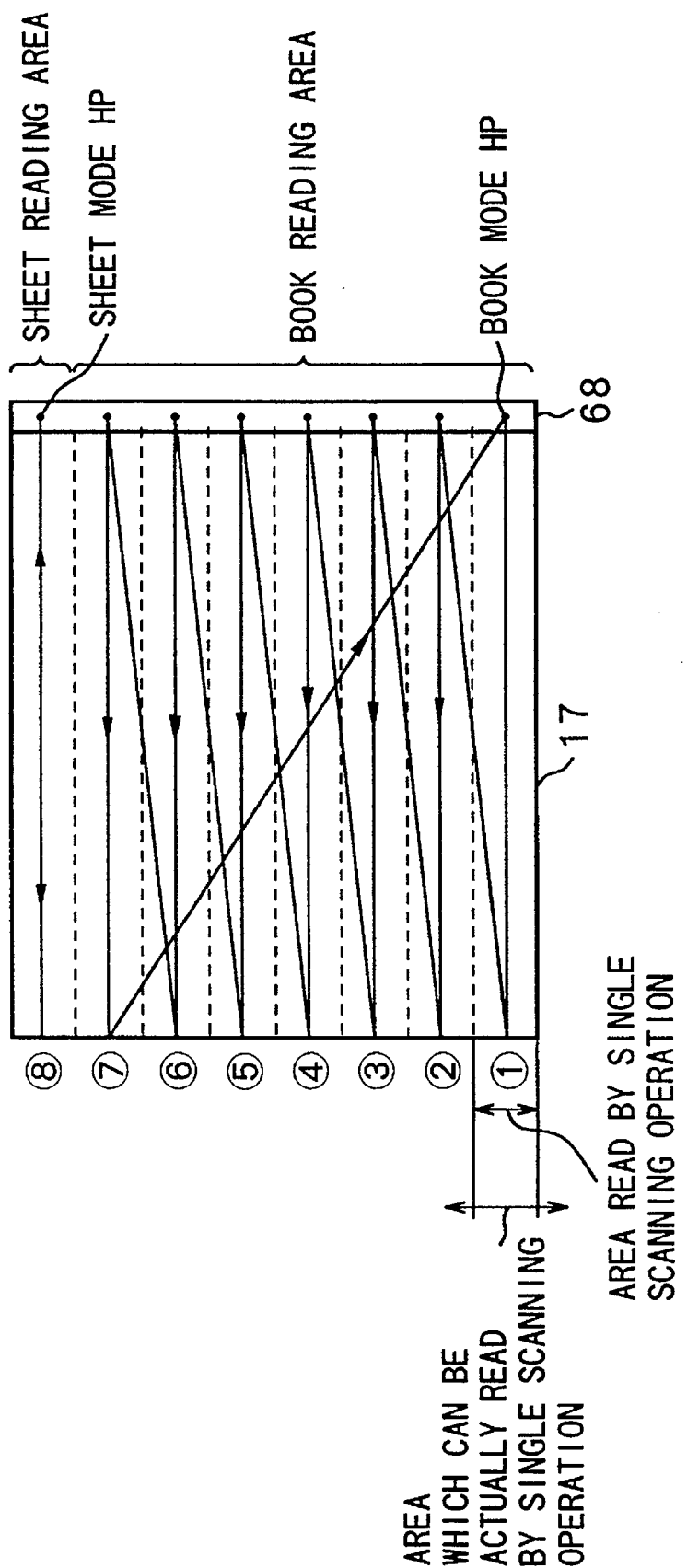

FIG. 6 illustrates the reading operation to be performed in the book mode and the sheet mode.

In the book mode, the CCD unit 18 is moved to a book mode home position (book mode HP) in the correction area 68 shown in FIG. 6 and the operation of reading the entire surface of the original document placed on the original document frame glass 17 is commenced from the book mode HP. Prior to scanning the original document, setting of data required to perform a shading correction, a black level correction, a color correction or the like is performed in the correction area 68. Then, the main scanning directional scanning operation in the direction designated by the arrow is commenced by the main scanning motor 50. After the operation of reading an area designated by (1) has been completed, the main scanning motor 50 is reversely rotated and as well as the sub-scanning motor 60 is rotated so that a sub-scanning direction movement to an area designated by (2) of the correction area 68 is made. Then, similarly to the operation of main-scanning the area (1), the shading correction, the black level correction, the color correction and the like are performed if necessary before an operation of reading area (2) is performed.

By repeating the above-described scanning operation, the entire surface of each of areas (1) to (7) is performed before the CCD unit 18 is again returned to the book mode HP after area (7) has been read. That is, according to this embodiment, a reading method in which the above-described predetermined areas are serial-scanned is employed. Since the original document frame glass 17 is used with an original document of a size of A2 or less, the scanning operation must be performed more frequently in actual fact. However, the description is made in a simple manner in order to make the description to be understood easily.

In the sheet mode, the CCD unit 18 is moved to a sheet mode home position (sheet mode HP) as illustrated before the entire surface of the sheet-like original document corresponding to area (8) is repeatedly read by intermittently driving the sheet conveyance motor 61. Prior to performing scanning of the original document, the shading correction, the black level correction, the color correction and the like are performed. Then, the main scanning directional scanning operation is commenced by rotating the main scanning motor 50 in a direction designated by an arrow. When the operation of reading area (8) in the forward direction has been completed, the main scanning motor 50 is reversely rotated and as well as the sheet conveyance motor 61 is rotated during the reverse directional scanning operation, causing the sheet-shape original document to be moved in the sub-scanning direction by a predetermined quantity. Then, a similar operation is repeated so that the entire surface of the sheet-shape original document is read.

Assuming that the above-described reading operation is an equal-magnification reading operation, the area which can be read by the CCD unit 18 is, in actual fact, a wide area as shown in FIG. 6. That is, the above-described areas (1) to (8) shown in FIG. 6 overlap each other by an area corresponding to several pixels, for example, an area corresponding to about 10 pixels. The reason for this lies in that the digital color copying machine according to this embodiment performs an operation by using peripheral pixel data when pixel data about the subject pixel is determined for the purpose of performing the magnifying varying function such as the enlarging and contracting operations, the spatial filter process or the error diffusion method or the like. That is, since the region which can be recorded by the recording head 37 is determined to 256 bits per operation as described above, at least image information about a region corresponding to 512 bits is required which is two times the 256 bits in a case where a reduction operation by, for example, 50% is performed. Therefore, the scanner portion 1 includes a function capable of reading/transmitting image information about an arbitrary image region by a single main scanning reading operation.

(Film Projecting System)

According to this embodiment, projecting exposure means for projecting a film can be attached to the scanner portion 1.

FIG. 7 is a perspective view which illustrates the scanner portion 1 to which a projector unit 81 serving as the projecting exposure means and a reflecting mirror 80 are attached.

The projector unit 81 is a projector for projecting a negative film and a positive film and arranged in such a manner that a film is held by a film holder 82 so as to be loaded into a projector unit 81. An image projected from the projector unit 81 is reflected by the reflecting mirror 80 before it reaches a fresnel lens 83. The fresnel lens 83 converts the above-described image into parallel beams so as to image them on the original document frame glass 17. As described above, the negative film or the positive film image is imaged on the original document frame glass 17 as a result of the actions of the projector unit 81, the reflecting mirror 80 and the fresnel lens 83. Therefore, the development and reading of the image can be performed by the CCD unit similarly to the operation for reading a reflected image.

Figure 8:
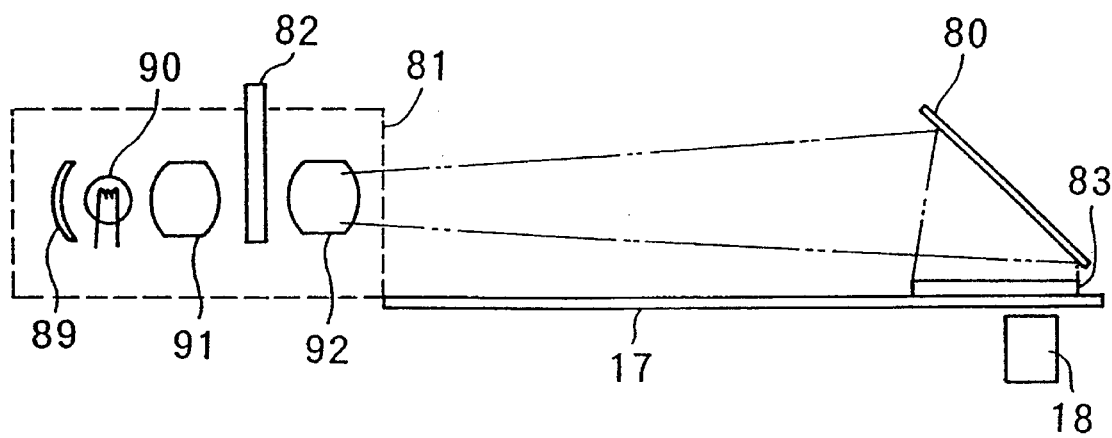

FIG. 8 further illustrates the above-described film projecting system.

The projector unit 81 comprises a halogen lamp 90, a reflecting plate 89, a convergent lens 91, the film holder 82 and a projecting lens 92. Direct light emitted from the halogen lamp 90 and reflected light reflected by the reflecting plate 89 are converged by the convergent lens 91 before the converged light reaches an opening formed in the film holder 82. The film holder 82 has the opening the size of which is, to a certain degree, larger than one frame of the negative or the positive film so that it can be easily accommodate the film.

Projecting light which has reached the film holder 82 passes through the film accommodated in the film holder 82 so that an image projected on the film can be obtained. A projected image thus-obtained is optically enlarged by the projecting lens 92 before its propagating direction is changed by the reflecting mirror 80. Then, the projected image is converted into an image formed by parallel beams by the fresnel lens 83. The image thus-formed is then read by the CCD unit 18 disposed on the inside of the scanner 1 in the above-described book mode so as to be converted into a video signal.

Figure 9:
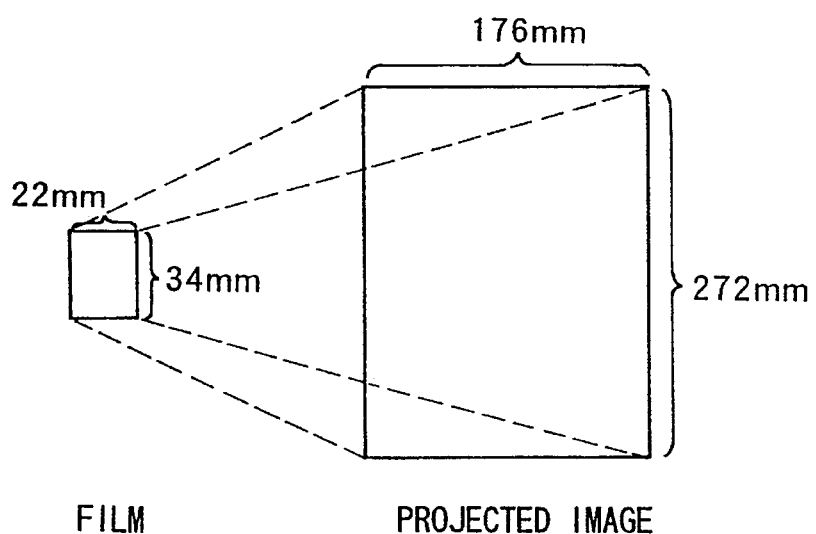

FIG. 9 illustrates the relationship between the film and the projected image formed on the original document frame glass. Referring to FIG. 9, a film image the size of which is 22×34 mm is magnified by 8 times before it is imaged on the original document frame glass 17.

<Operation of Functional Blocks>

FIG. 10 illustrates the timing of the image between the blocks shown in FIG. 1.

Signal BVE is a signal denoting an effective image region for each scan in the main scanning read operation shown in FIG. 6. Signal VE is a signal denoting an effective region for an image read by the CCD16 for each line and is only significant when the signal BVE is significant. Signal VCK is a clock signal for transmitting image data VD. Both of the signals BVE, and VE change in synchronization with the signal VCK. Signal HS is a signal for use in a case where a significant region and a non-significant region are discontinuously repeated during an output of the signal VE for one line. Therefore, the signal HS is not required in a case where the overall portion is significant during the output of the signal VE for one line. The signal HS denotes the commencement of an image output for one line.

(Image Processing Portion)

Figure 11A:
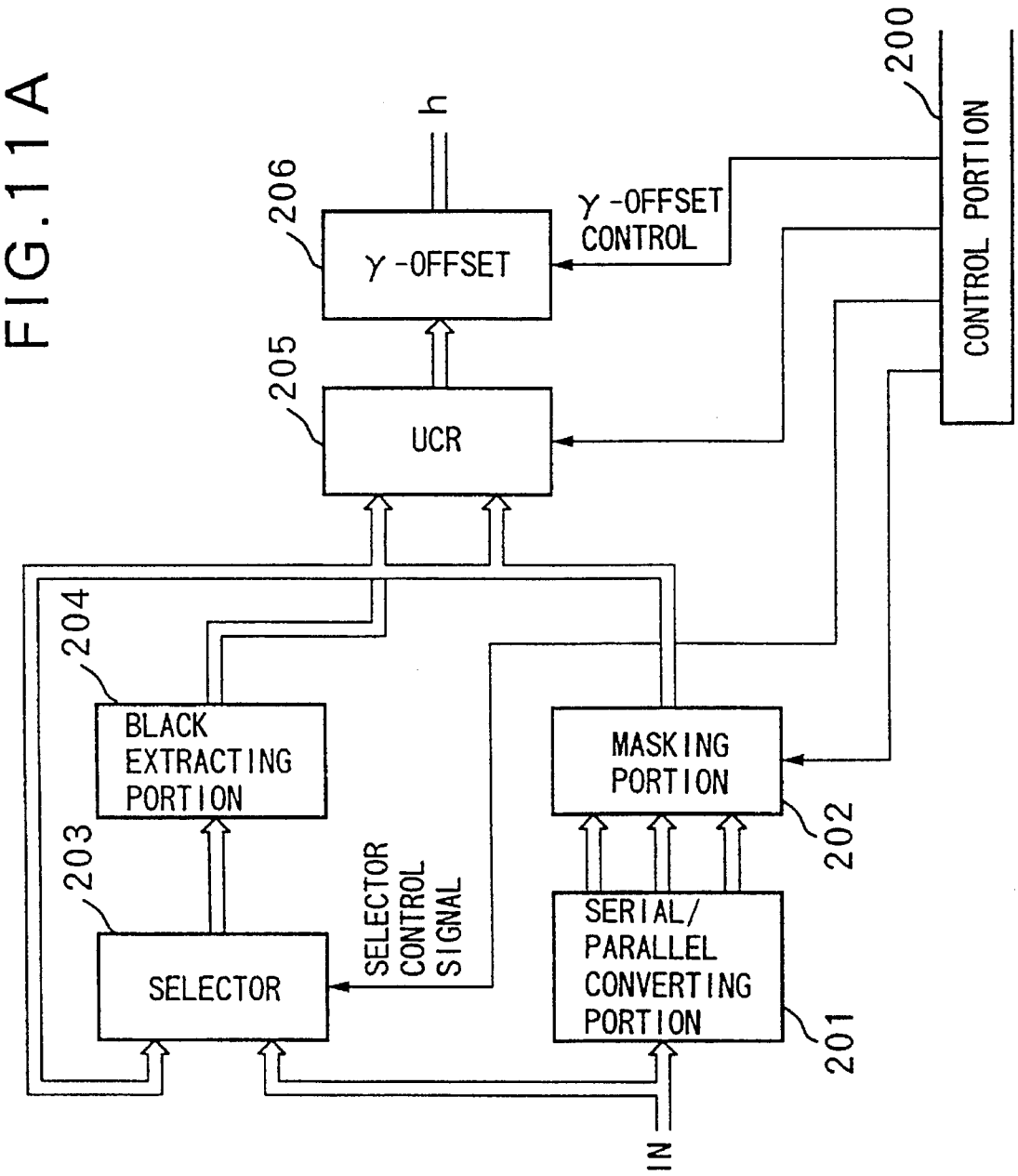
FIGS. 11A and 11B illustrate the structure of an image processing portion.
Figure 11B:
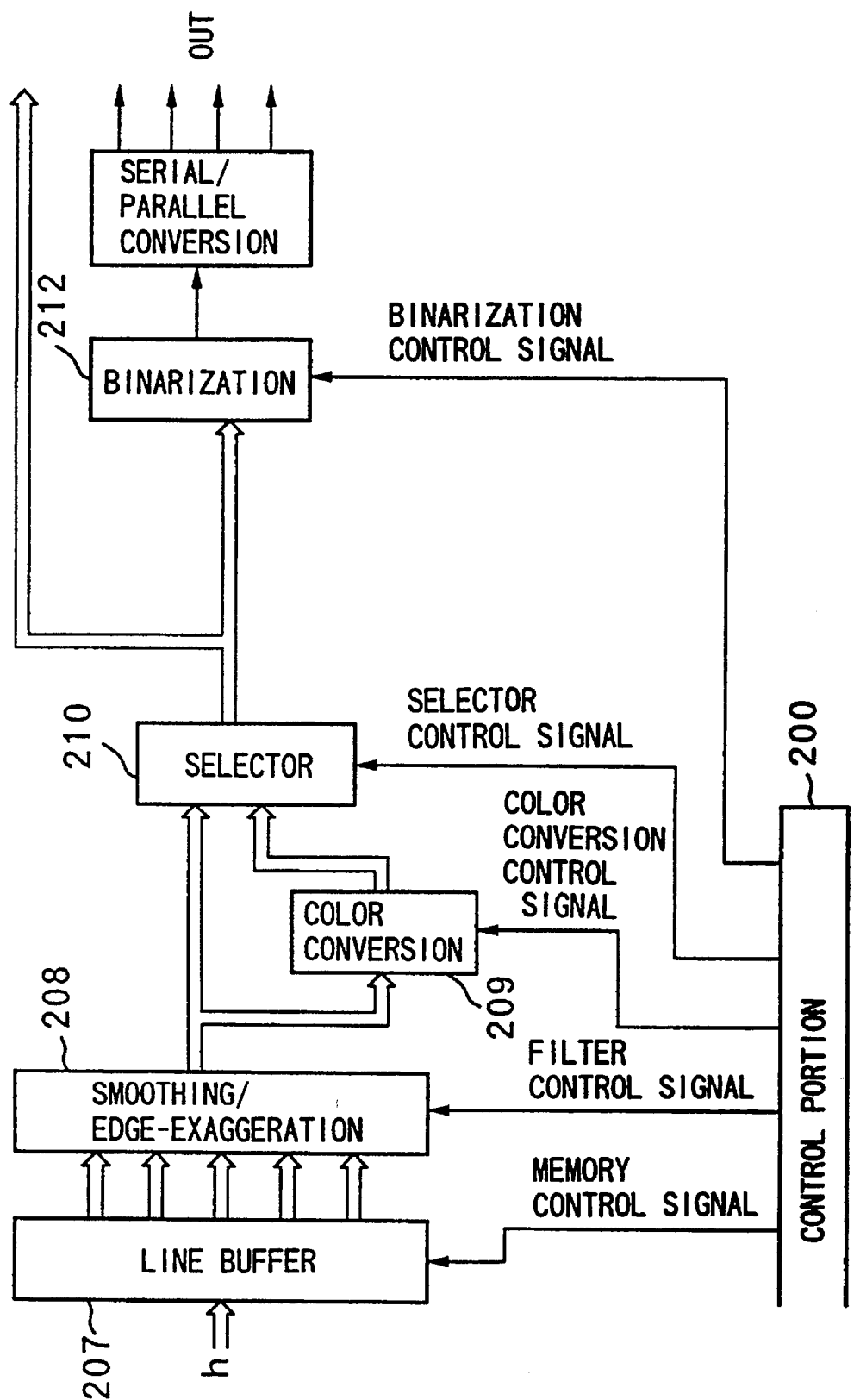

The schematic signal processing operation performed in the image processing portion 107 will now be described with reference to FIG. 11.

Referring to FIG. 1, image data (hereinafter called "input image data") to be supplied to the image processing portion in a serial manner (for example, a sequential order of Y, M and C) is transmitted to a serial-to-parallel converting portion 201 so as to be converted into parallel signals denoting Y (yellow), M (magenta) and C (cyan) before they are supplied to a masking portion 202 and a selector 203. The masking portion 202 includes a circuit for correcting the color turbidity of output ink by using the following equation:

$$\begin{pmatrix} Y' \\ M' \\ C' \end{pmatrix} = \begin{pmatrix} a11 & a12 & a13 \\ a21 & a22 & a23 \\ a31 & a32 & a33 \end{pmatrix} \begin{pmatrix} Y \\ M \\ C \end{pmatrix}$$

where

Y, M and C: input data

Y', M and C': output data

The above-described 9 coefficients a11 to a33 are used to correct the turbidity of ink in the masking portion 202 determined in response to a masking control signal supplied from the control portion 200 before they are supplied, in the form of serial signals, to the selector portion 203 and a UCR port ion 205.

The selector 203 receives input image data and image data transmitted from the masking portion 202. The selector 203 selects input image data in response to a selector control signal 1 transmitted from a normal control portion 200. In a case where the color correction has not been performed sufficiently in the input system, image data transmitted from the masking portion 202 is selected in response to the control signal 1 so as to be transmitted. Serial image data transmitted from the selector 203 is supplied to a black extracting portion 204. Since the minimum value of each of Y, M and C for one pixel is made to be data for black, the black extracting portion 204 detects the minimum values of each of Y, M and C. Data for black thus-detected is supplied to the UCR portion 205.

The UCR portion 205 subtracts the quantity corresponding to black from each of the Y, M and C signals. As for black data, coefficients are simply multiplied. Black data received by the UCR portion 205 is subjected to a process of correcting the time deviation from black data transmitted from the masking portion 202 before it is subjected to the following calculation:

$Y'=Y-a1 \cdot Bk$ $M'=M-a2 \cdot Bk$ $C'=C-a2 \cdot Bk$ $Bk'=a4 \cdot Bk$ where symbols Y, M, C and Bk denote data supplied to the extraction portion and Y', M', C" and Bk' denote data transmitted from the extraction portion. The coefficients (a1, a2, a3 and a4) are determined in response to the UCR control signal transmitted from the control portion 200. Data transmitted from the UCR Portion 205 is then supplied to a γ off set portion 206. The γ off set portion 206 performs the following gradation correction as follows:

$Y'=b1 \cdot (Y-C1)$ $M'=b2 \cdot (M-C2)$ $C'=b3 \cdot (C-C3)$ $Bk'=b4 \cdot (Bk-C4)$ where symbols Y, M, C and Bk denote data supplied to the γ off set portion 206 and Y', M', C' and Bk' denote data transmitted from the γ off set portion 206.

The coefficients (bin to b4 and c1 to c4) shown in the above-described equation are determined in response to a γ off set signal transmitted from the control portion 200.

A signal, which has been subjected to the gradation correction in the γ off set portion 206, is supplied to a line buffer 207 which stores image data for N lines. The line buffer 207, in a 5-line parallel manner, transmits data for 5 lines required for an ensuing smoothing/edge exaggerating portion 208 in response to a memory control signal. The signals for 5 lines are supplied to a spatial filter capable of change its size in response to a filter control signal transmitted from the control portion 200 so as to be smoothed and then is edge-exaggerated. The smoothing/edge exaggerating portion 208 will be described in detail later.

Image data transmitted from the smoothing/edge exaggerating portion 208 is supplied to a color converting portion 209 so as to be color-converted in response to a color conversion control signal transmitted from the control portion 200. Image data is replaced in the color converting portion 209 in accordance with data previously received from the digitizer 114 shown in FIG. 1 and denoting the color to be converted, color realized by the conversion and a region in which its signal is significant. According to this embodiment, the detailed structure of the color converting portion 209 is omitted from description. The image signal transmitted from the edge exaggerating portion 208 and the image signal which has been subjected to the color conversion are supplied to a selector 210 which selects image data to be transmitted in response to a selector control signal 2. Image data to be transmitted is determined by instructing a significant region supplied from the above-described digitizer 114. The image signal selected by the selector 210 is supplied to the frame memory 110 and the binarizing portion 108 shown in FIG. 1. A system to be received by the frame memory 110 will be described later.

(Binarizing Portion)

Then, the binarizing portion 108 will now be described. Image data is supplied to the binarizing portion 108 in such a manner that it is supplied to a dither portion 212 with serial 8 bits in a sequential order of Y, M, C and Bk.

The dither portion 212 has a memory space for each color the size of which is 4 bits in the main scanning direction and 8 bits in the sub-scanning direction so that the dither matrix size and the dither threshold value in the matrix are set in response to a dither control signal supplied from the control portion 200. At the time of the operation performed by the dither circuit, image read region signals for one line of the CCD are counted in the mechanical main scanning direction, while image video clocks in the subs-scanning direction are counted. As a result, the established dither threshold value on the memory space is read out. Furthermore, a further serial dither threshold value can be obtained by serially changing over the above-described memory space for Y, M, C and Bk. Then, the threshold value thus-obtained is supplied to a comparator (omitted from illustration) so as to be subjected to a comparison with image data supplied from the selector. The comparator transmits the following data:

"1" is transmitted if image data>threshold value

"0" is transmitted if image data≦threshold value

The above-described data is then formed into parallel 4 bit data in the serial-to-parallel converting portion so as to be transmitted to the buffer memory 110 and the binary synthesizing portion 109 shown in FIG. 1.

(Head Correction Portion)

The head correction portion 211 will now be described with reference to FIG. 19. According to this embodiment, all of 256 nozzles of the recording head 37 are used at the time of the enlarging operation and the equal-magnifying operation. For example, in a case where an original image is halved in size, a control is performed in such a manner that nozzles for 128 pixels are used by multiplying data read by the CCD 16 by the reduction ratio 1/2. Therefore, all of 256 nozzles are used at the time of the enlarging operation and the equal-magnifying operations, while 128 nozzles, which is the half of 256 nozzles, are used at the time of the contraction operation.

(Frame Memory Control Portion)

Figure 16:
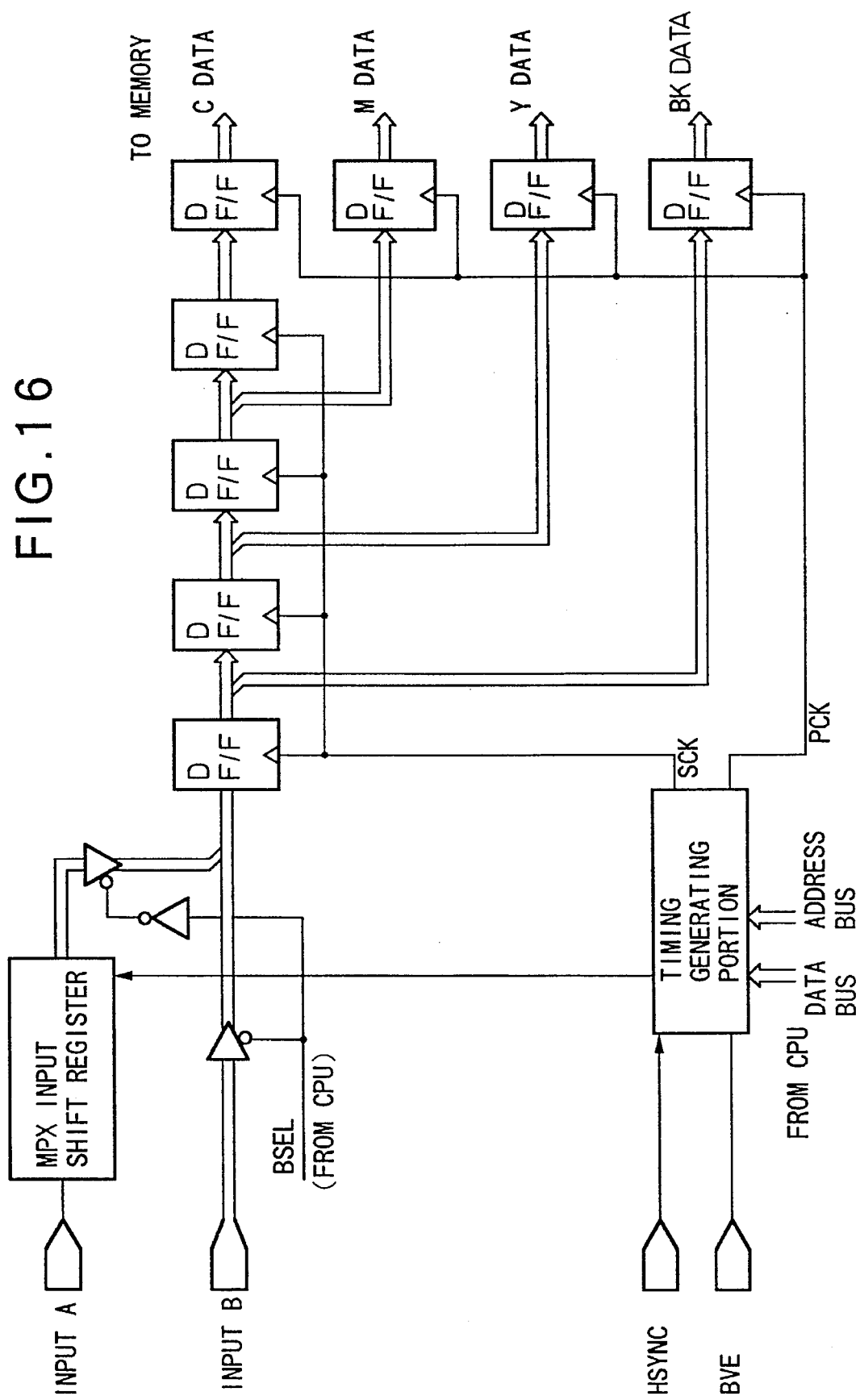
FIG. 16 illustrates the detailed structure of an input image data processing portion.
Figure 18A:
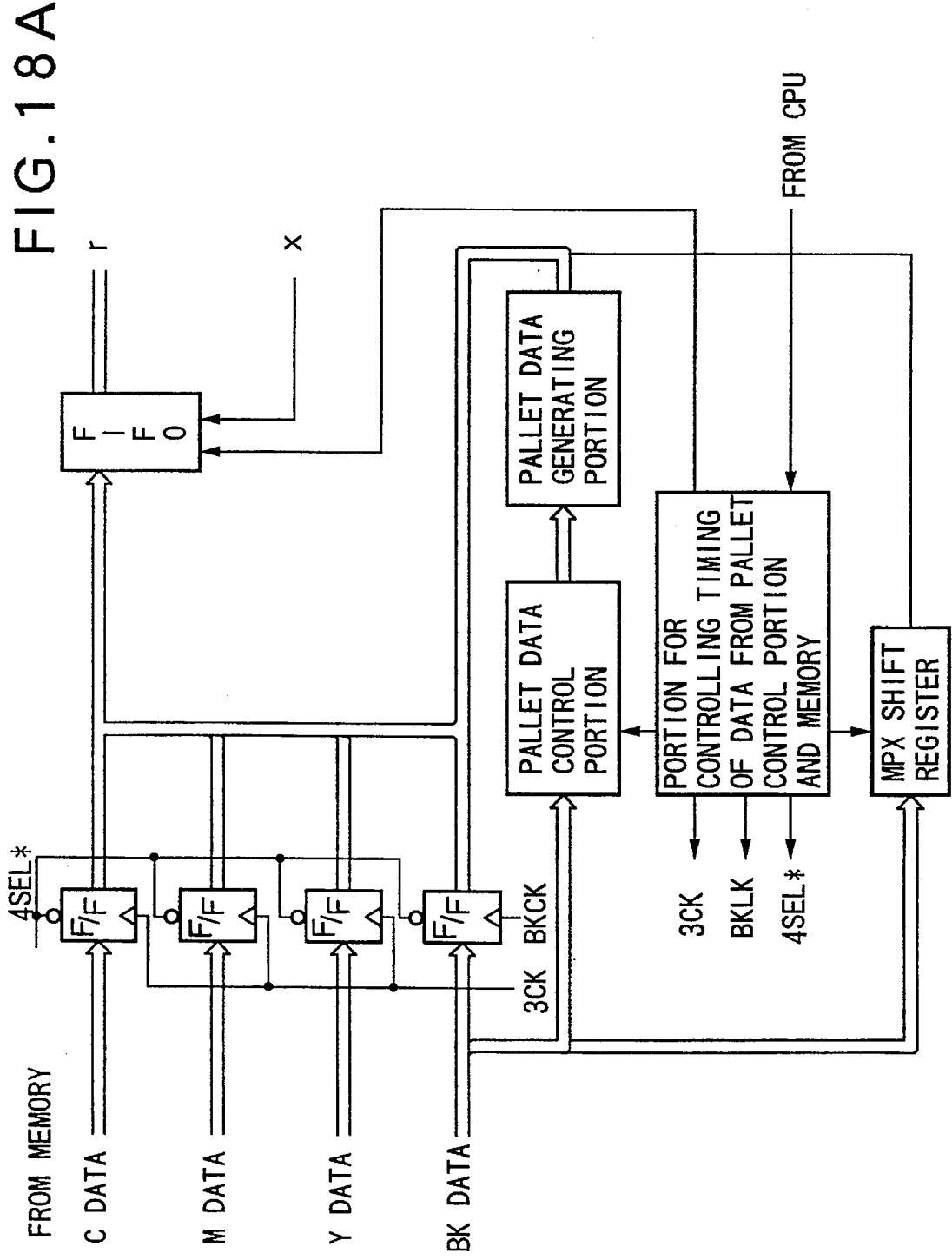
FIGS. 18A and 18B illustrate the detailed structure of an output image data processing portion.
Figure 18B:
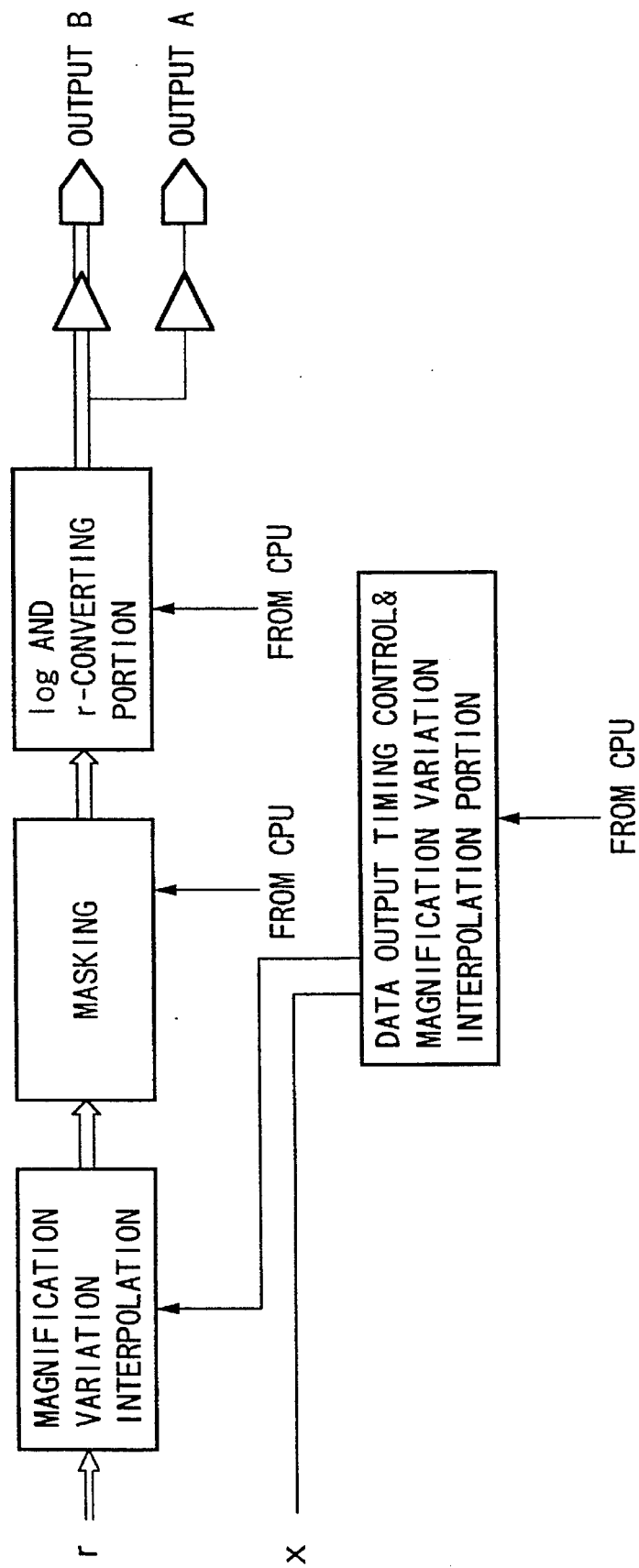

The frame memory control portion 4 will now be described. FIG. 12 is a block diagram which illustrates the detailed structure of the frame memory 110 and the control portion 112. FIG. 16 is a block diagram which illustrates the detailed structure of the input image data processing portion 123. FIG. 18 is a block diagram which illustrates the detailed structure of the output image data processing portion 124.

First, the frame memory 110 and the control portion 112 will now be described with reference to FIG. 12. Reference numeral 503 represents a CPU which comprises a known microprocessor according to this embodiment. Reference numeral 504 represents a ROM for storing the program for operating the CPU. Reference numeral 505 represents a RAM for use as a working region. A GPIB controller 508 and an SCSI controller 509 transmit/receive image data to and from an external host computer (omitted from illustration) and issue instructions and transmit/receive status. The above-described controllers 508 and 509 are capable of directly transmitting/receiving image data to and from frame memories 500 to 502 (to be described later) via a DMA controller 507. As a result, high speed data transmission can be performed. Reference numeral 520 represents a mail box for performing a communication with the control portion 111. Specifically, it exchanges various information items by using a known 2-port RAM.

The frame memories 500 to 502 have a capacity 4M byte ×3=12M byte and therefore 24 address lines are required to be provided. However, since the CPU 503 and the DMA controller 507 have only 16 address lines, a bank register 506 is used for to compensate the shortage address lines. The CPU 503 previously sets the upper 8 address lines for the frame memories 500 to 502, to which a requirement of the address is made, to the bank register so that, when the DMA controller 507 makes an access to the frame memories 500 to 502, the upper 8 addresses are automatically compensated from the bank register and thereby 24 addresses are transmitted.

An image reading portion address generating circuit 510 is a circuit for generating an address for use when image data transmitted from the input image data processing portion 112, to be described later, is written to the frame memories 500 to 502. An image printing portion address circuit 511 is a circuit for generating an address for use when image data stored in the frame memories 500 to 502 is read by an output image data processing portion 123 to be described later. Although omitted from illustration, the above-described circuits 510 and 511 are arranged in such a manner that address values and other control information can be set therein by the CPU 503.

Reference numeral 514 represents an address converting circuit which serves as a conversion table for converting upper 9 addresses of 24 addresses which are generated when the frame memories 500 to 502 are subjected to the access by the above-described circuits 503, 507, 506, 510 and 511. Specifically, the conversion table comprises a high speed RAM which is, according to this embodiment, arranged to be of a type having an access speed of 25 ns. The lower 15 addresses of all of the 24 addresses are directly connected to the frame memories 500 to 502.

Figure 13:
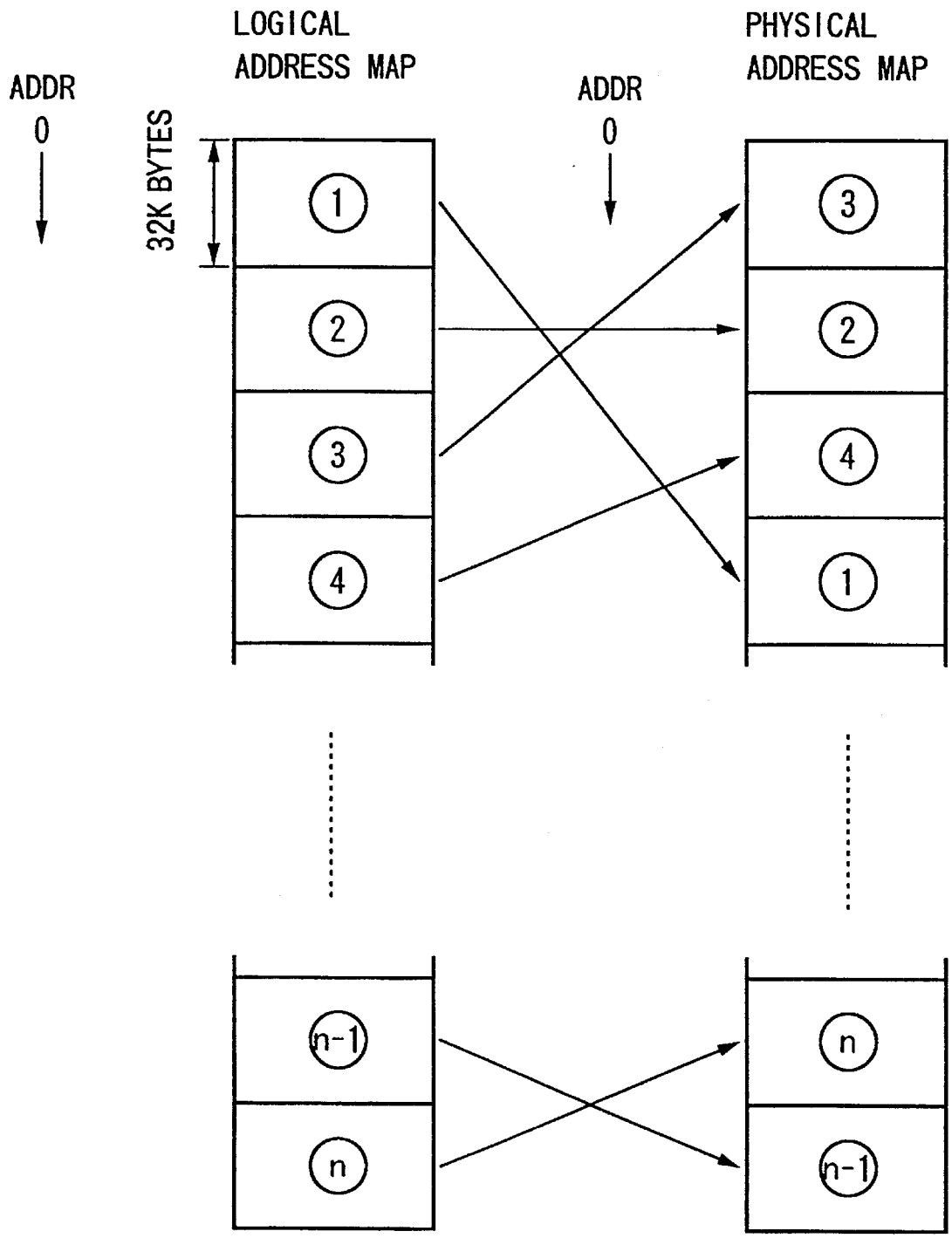
FIGS. 13, 14(a) and 14(b) illustrate the relationship between a logical address map and a physical address map.

Then, the address conversion will now be described with reference to FIG. 13. Hereinafter, the description is made in such a manner that the address to be supplied to the address conversion circuit 514 is a logical address, while an output address is a physical address. As shown in FIG. 13, the lower 15 addresses of all of the addresses are directly connected to the frame memories 500 to 502. Therefore, image data can be disposed at an arbitrary physical address by setting one unit composed of 32K byte for one block in the address conversion circuit 514. By using the above-described mechanism, a plurality of images are set in the frame memories 500 to 502. Even if an operation of deleting a specific image is performed, a necessity of creating continuous empty areas by performing movement of data or the like can be eliminated and thereby a high speed operation can be performed by again setting the empty regions in the frame memories 500 to 502 to be continued with respect to the address converting circuit 514 when viewed in the logical address.

Then, the control of the frame memories 500 to 502 will now be described. As described above, each of the frame memories 500 to 502 has 4M byte so that the overall capacity is 12M byte. The frame memory 500 stores image data for red (R) or cyan (C), 501 stores image data for green (G) or magenta (M) and 502 stores image data for blue (B) or yellow (Y). In a case of a multi-value data, one pixel is formed by three bytes composed of each one byte for R (C), G (M) and B (Y) so that an access is made in units of three bytes.

Figure 14A:
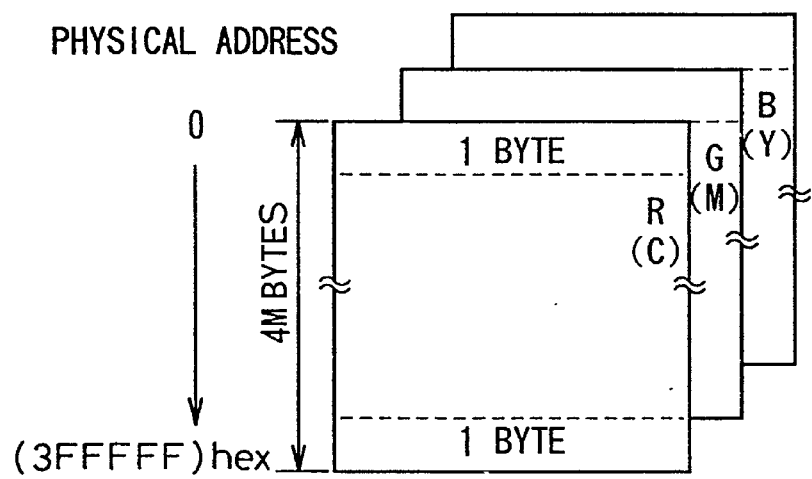
Figure 14B:
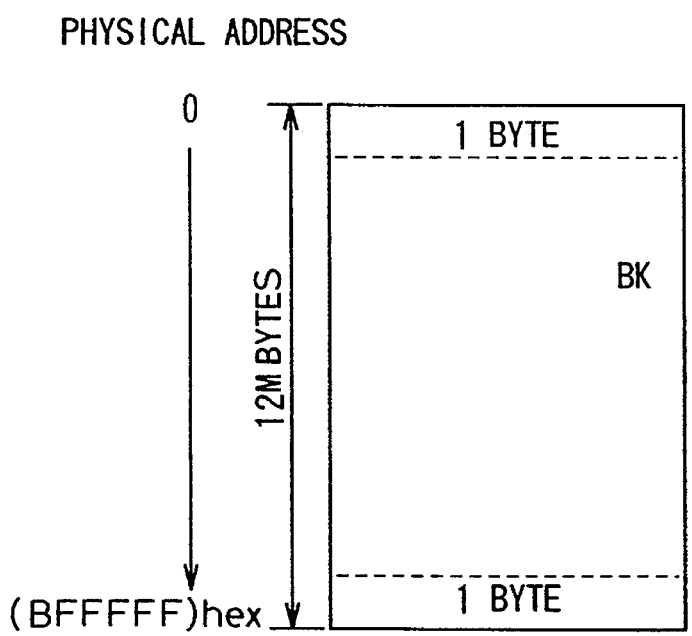

Bk of an image data input portion is selected in a case of a black image or a monotone image and is accessed in units of one byte. The physical address is as shown in FIG. 14(a) or 14(b). The frame memories 500 to 502 are viewed from the CPU 503 and the DMA controller 507 as a continuous memory having a capacity of 12M bytes similarly to the above-described Bk mode. In a case where image data is transmitted/received to and from a host computer (omitted from illustration), an address for each side from the above-described relationship is determined so as to be set.

Access demands to the frame memories 500 to 502 are classified into the following five commands:

(1) Write demand from the image reading portion;

(2) Read demand from the image printing portion;

(3) Memory refresh demand because the dynamic RAM is employed according to this embodiment;

(4) Read/Write demand from the CPU 503; and (5) Read/Write demand from the DMA controller 507.

Since the above-described demands (4) and (5) are connected to a CPU bus and the CPU 503 receives the demand from the DMA controller 507, it can be seen as a single demand from the CPU 503 for the frame memories 500 to 502 (hereinafter, the above-described two demands are collectively called a "CPU demand"). Therefore, there are four demands which are asynchronously generated. The memory demands generated asynchronously are controlled by a time slot control portion 512 in such a manner that each memory demand is assigned by a time division method.

Then, the operation will now be described with also reference to a timing chart shown in FIG. 15. The cycle time of the frame memories is 250 ns and one access slot corresponds to 250 ns at the timing of 601. The time slot control portion 512 checks and receives the access demand made to the frame memories 500 to 502 at a period of 250 ns. Furthermore, as is taken place at the timing 601, an assignment of the memory demand to the slot can be made by the CPU by initially setting an arbitrary value because the access slots are given numbers from 0 to 3.

FIG. 15 illustrates the setting at the time of default, wherein the demand from the image reading portion is assigned to access slot 0, similarly the image printing portion is assigned to access slot 2 and access slots 1 and 3 are assigned to refresh and CPU. Since refresh demand is made at a large interval (one memory demand in about 12μ), it is assigned to the same slot to which the CPU is assigned. The structure is arranged in such a manner that the circuit 512 checks the precedence of the two and the refresh command is given priority in a case where a competition takes place. Thus, the memory demands generated asynchronously are made to be in synchronization with the operational timing of the frame memories 500 to 502. When a memory command is received, a memory timing generating portion 513 is actuated to generate required memory timing so that the memory access is commenced. The memory access speed of the image data input portion 515 and the image data output portion 516 is 1.25μ or higher as shown in FIG. 15. Since the data transmission rate of the image data input portion 515 or the image data output portion 516 is 1.33 Ms/pixel, an access can be satisfactorily made because following can easily be achieved.

Referring to FIG. 16, the block input image data processing portion 123 for transferring data to the memory will now be described. In order to easily make the description, the memory is composed of 8 bits.

The data input is classified into two types composed of type A in which bit data of 8 bits or less which is smaller than the capacity of the memory is supplied and type B in which 8 bit data, which is the capacity of the memory, is supplied. Data of input A is subjected to a serial-to-parallel conversion to be an 8-bit data by the MPX shift register. Since the MPX shift register has a multiplex function, it is able to convert serial data into parallel data by converting the order of data, for example:

Example of input of serial data:

CoMoYoKoC1M1Y1K1 ... C7M7Y7K7 ...

Example of input of parallel data:

C Data (CoC1 ... C7), M data (MoM1 ... M7)

Y Data (YoY1 ... Y7), Bk Data (kok1 ... k7)

or

C Data (C7C6 ... Co), M Data (M7M6 ... Mo)

Y Data (Y7Y6 ... Yo), Bk Data (k7ks ... ko)

Since the MPX shift register is controlled by the clocks generated in the timing generating portion, data can be thinned by the clock. Therefore, data for only, for example, C or M can be received by receiving a clock the period of which is ¼ of the converting clock and as well as data can be thinned not only in the main scanning direction but also in the sub-scanning direction by making to be synchronization with Hsync (one main scanning directional time pulse). Therefore, a reduction operation can be performed with the above-described clock.

Furthermore, data is serially shifted to C Data, M Data, Y Data and Bk Data. In synchronization with timing transmitted from SCK, the sequential order of C Data, M Data, Y Data and Bk Data can, of course, be changed. Thus, serial data is changed into four parallel data items before they are set to a memory port by a PCK.

Since input data B is 8-bit data adaptable to the memory, it is directly transferred to the memory port. However, it can be thinned by the SCK as described above about the input data A. Therefore, also input data B can be reduced similarly to input data A in both the main and the sub-scanning directions.

FIG. 17 illustrates the relationship between input data (B) and SCK and PCK when a reduction of 50% is made in the main scanning direction and the sub-scanning direction. In order to easily make the description, only input data B is illustrated. Also in input data A, a similar operation can be performed since it has been converted into 8-bit data.

Since a reduction of 50% is made according to this example, data must be halved. Therefore, in a case where four data items about C, M, Y and Bk correspond to one pixel, data can be halved by shifting continuous data Cn, Mn, Yn and Kn in the main scanning direction and by inhibiting the fetching of next data Cn+1, Mn+1, Yn+1 and Kn+1. As for the sub-scanning operation, a gate is applied to each of SCK and PCK so that data can be thinned at a period of 2 Hsync. Therefore, a reduction of 50% can also be performed in the sub-scanning direction. Since the above-described reduction operation is performed in the data thinning manner, a reduction in a step of 1% can, of course, be performed.

Although an F/F (flip-flop) controlled by PCK is disposed at the memory port shown in FIG. 16, an FiFo memory or the like is sometimes required to be provided for the purpose of arranging timing depending upon the timing of data supplied from outside or the speed of the operation of the memory. This example is arranged in such a manner that the memory is capable of acting at sufficiently high speed with respect to the speed of data supplied from out side.

Signal BSEL shown in FIG. 16 is a signal which acts to switch over input data and which can be controlled by the CPU in such a manner that, when it is "H", input data A becomes significant and when the same is "L", input data B becomes significant. In a case where image data is read by a serial scanning operation to performing copying it, data for printing is processed by performing binarization. Therefore, a process of retaining data at the junction must be performed and thereby effective pixels+junction pixels are read and transferred. However, the above-described junction pixels are deleted but only significant pixels are distinguished and stored in a case where image data is stored in the memory. The junction process is performed in a manner in a description made about the output so that an image having no junction can be printed out.

In order to cut out only significant pixels, information about the number of significant pixels to be accommodated from the reading system is obtained from the scanner portion. Then, the timing is generated in the timing generating portion shown in FIG. 16 in such a manner that data about the significant pixel regions can be written to the memory at 1H. That is, the number of pixels to be fetched and the corresponding clock counted from Hsync must be controlled. Therefore, the reading commencement position is changed depending upon the input mode, that is, whether the input A or input B is made. It can be performed by changing the timing generated by the SCK and thereby by generating the PCK for the significant pixels. That is, image data for 128 pixels+a (for example, 12 pixels) is transmitted from the CCD 16 shown in FIG. 16 at the interval of the timing of Hsync shown in FIG. 17. However, since the PCK signal is transmitted from the timing generating portion (shown in FIG. 16) in only a period of SCK shown in FIG. 17, only data for 128 pixels which is obtained by deleting the overlap portion, which includes the junction pixels, are latched so as to be written to the memory 110. The SCK and PCK becomes as shown in FIG. 17. Since timing must be changed in accordance with the case as described above, the Fifo memory is used in the timing generating portion so as to constitute a structure which can be freely controlled by the CPU. Furthermore, the generation of timing is performed in synchronization with the scanner by means of signals Hsync and BVE.

Then, the block output image data processing portion 124 for transmitting data from the memory to the printing processing device will now be described with reference to FIG. 18. In order to easily describe it, a structure having an 8-bit memory is employed.

First, data from the memory is classified into C Data, M Data, Y Data and Bk Data. After a synchronization has been made between the speed of the four multi-value memory data and the external portion, an enlargement interpolation operation (equal-magnification included) in the main scanning direction and the sub-scanning direction are performed. Then, the color modification is performed by the masking portion before a log conversion and γ conversion are performed by a log & γ conversion portion. In a case of multi-value data, an output to output B is made, while an output to output B is made in a case of binary data. Since memory data is capable of accommodating pallet data and binary data as well as multi-value data, the pallet conversion and a conversion to binary data are performed prior to performing speed alignment with the external portion in accordance with data.

First, a case of multi-value data will now be described. Since this example comprises a memory block composed of three blocks, C data, M data and Y Data can be read out simultaneously. Therefore, data from the memory is latched by 3CK. Since Bk Data can be obtained from data from any of memory blocks for C, M, Y or Data, it is latched by BkCK at the timing generated at the reading timing of Bk Data. As a result, a serial multi-value operation is performed in such a manner that C, M, Y and Bk are processed after one pixel has been processed. Hereinafter, one pixel is formed by multi-value data composed of four colors C, M, Y and Bk. The above-described conversion is controlled by a 4 SEL*signal and writing to the FiFo RAM.

Figure 20:
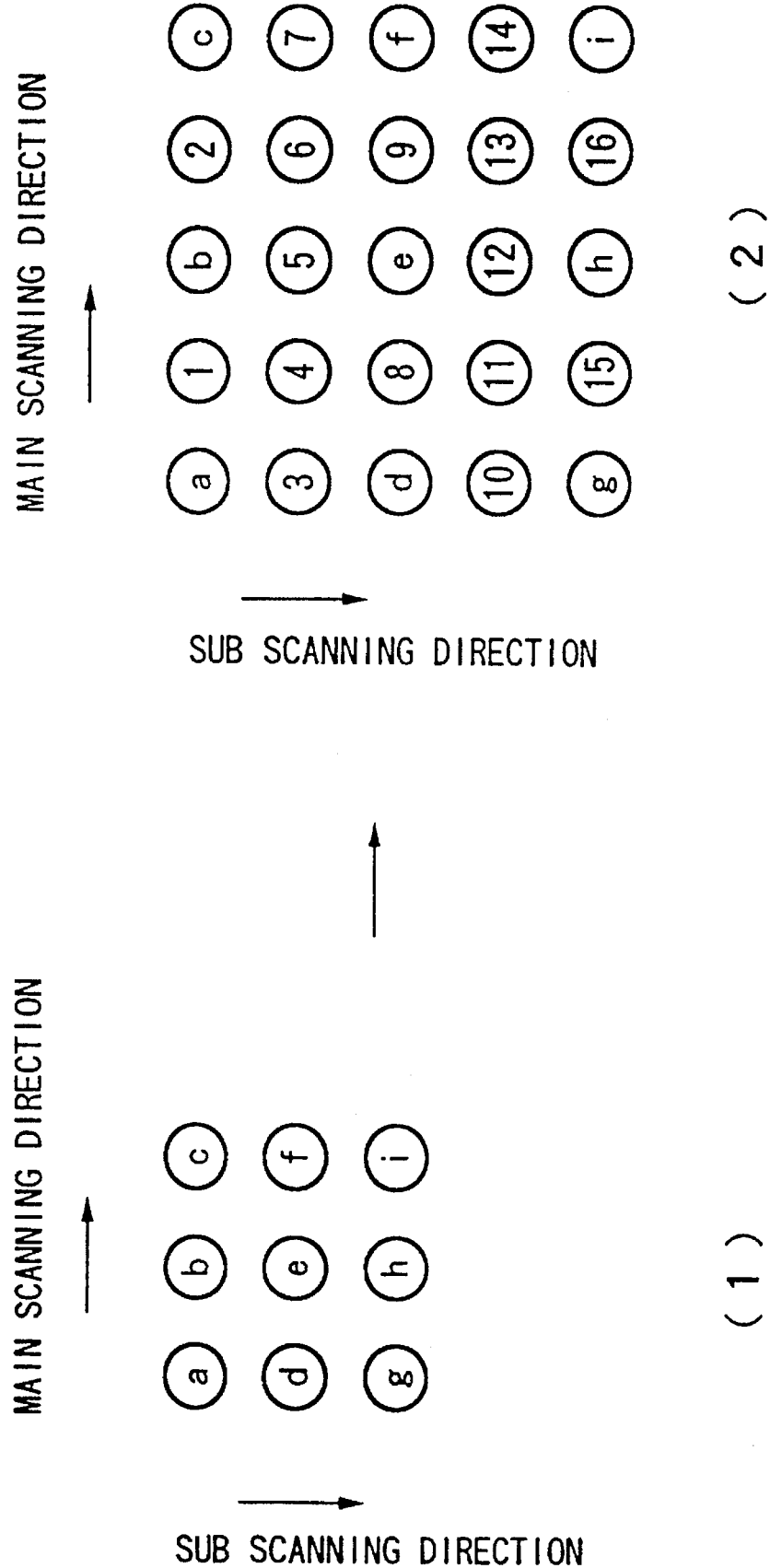

Then, data read out from the FiFo is subjected to a magnification variation interpolation. The description will now be made about an example which is selected from a variety of available magnification variation interpolation methods and in which an enlargement of 200% shown in FIG. 19 and 20 is made, wherein symbol A denotes data prior to performing the magnification variation interpolation and B denotes data after the same has been performed. The magnification variation interpolation is performed in the main and the sub-directions. First, the magnification variation in the main direction will now be described with reference to FIG. 19.

In a case of the apparatus according to this embodiment in which printing is performed in accordance with serial scanning, undesirable lines appear when the binarization is performed for the purpose of performing printing if the continuity of data is lost at the junction of scanned portions because the peripheral pixels around the subject pixel are required at the time of performing, for example, a spatial filter process is performed. In particular, such a problem becomes excessive in a case where the binarization is, in accordance with the error diffusion method, performed in the binarizing portion 108 which is disposed in the latter portion of the structure. Therefore, it is necessary for the apparatus according to this embodiment to collectively read the required pixel data+the junction pixel data in a case where image data is read from the memory. As shown in FIG. 19, also the data about the required pixels+junction pixels and magnification variation data corresponding to the magnification are stored so as to generate the address from the address generating portion 511 shown in FIG. 12 to prevent the junction. The magnification varying method in the case of the magnification is 200% may be arranged in such a manner that one data item is processed between two pixels. For example, the 256-th data can be obtained by adding data about the 128-th pixel and the 129-th pixel and then dividing it by two. Assuming that 8 pixels are required for the junction pixel across one band, the number of data items to be read from the memory for the purpose of performing the first scanning printing operation is in a range between the first to the 133-th data of the memory obtained by adding one data item to 125 data items+4 data items. The reason for this lies in that the 264-th data is processed from the 132-th and the 133-th information of the memory as shown in FIG. 19. As described above, the junction data is transmitted similarly to the processes according to the first scanning operation and the second scanning operation.

Although a case in which a magnification of 200% is described according to this embodiment, the operation for another arbitrary magnification may be performed. For example, the number of interpolations between two data items from the memory in a case of 250% can be obtained as follows: the number of the interpolations between the initial data items is one. However, since the above-described case in which the number of the interpolation is one is the same as the case of 200%, the number of the interpolations becomes two because the portion between next memories is 300% if 50% is left in the portion between next memories as a remainder. The reason why the above-described magnification variation is employed lies in that there arise a difference in data at the junction between scanners due to the calculation error if the interpolation is performed by calculations. However, the magnification method of the apparatus according to the present invention will cause an accurate junction process and magnification varying operation to be performed while eliminated an error at the junction.

Since no junction process is required for the magnification variation in the sub-direction, the operation in this case will now be described with reference to FIG. 20. In general, the magnification variation can be obtained from the following equation:

$$x \cdot a + (1-x) \cdot d$$

where symbols a and d are data items positioned across data the magnification of which is varied and interpolated.

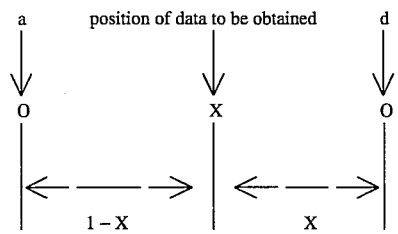

where the position x varies depending upon the magnifying power and the position to be obtained.

In the case of 200%, x=½. Therefore, the magnification can be obtained in such a manner that data items disposed on the two sides is halved in accordance with an equation 1−x=½ and they are added.

As for (1), (2), (8), (9) and (15), they can be obtained in the manner described with reference to FIG. 19. Furthermore, (3), (5), (7), (10), (12) and (14) can be obtained by the above-described method. In addition, (4), (6), (11) and (13) can be obtained from data the magnification of which has been varied. Then, data, which has been color-corrected as described above, is subjected to a color modifying process in the masking portion. The masking portion can be structured by a multiplier or a look-up table. The above-described masking portion can be used in an operation of modifying color data supplied from the external interface and a color matching operation. Furthermore, in a case where memory input data is R, G and B, the log & γ converting portion performs the log conversion operation to convert them into C, M and Y images adapted to the printer. In a case where C, M, Y and Bk data, the g modification is performed so as to transfer proper C, M, Y and Bk data to the printing device. In a case where all of C, M, Y and Bk data are printed by the masking portion and the log & γ converting portion, a problem arises in that ink overflows from the paper sheet if the area which is printed by all of the C, M, Y and Bk heads is too large. Therefore, the subject portion is as well as subjected to the density correction.

Then, the operation of controlling the pallet will now be described. Although the pallet is usually arranged to be an 8-bit pallet, a 4-bit, 2-bit and 1-bit pallets may be employed.

Figure 21:
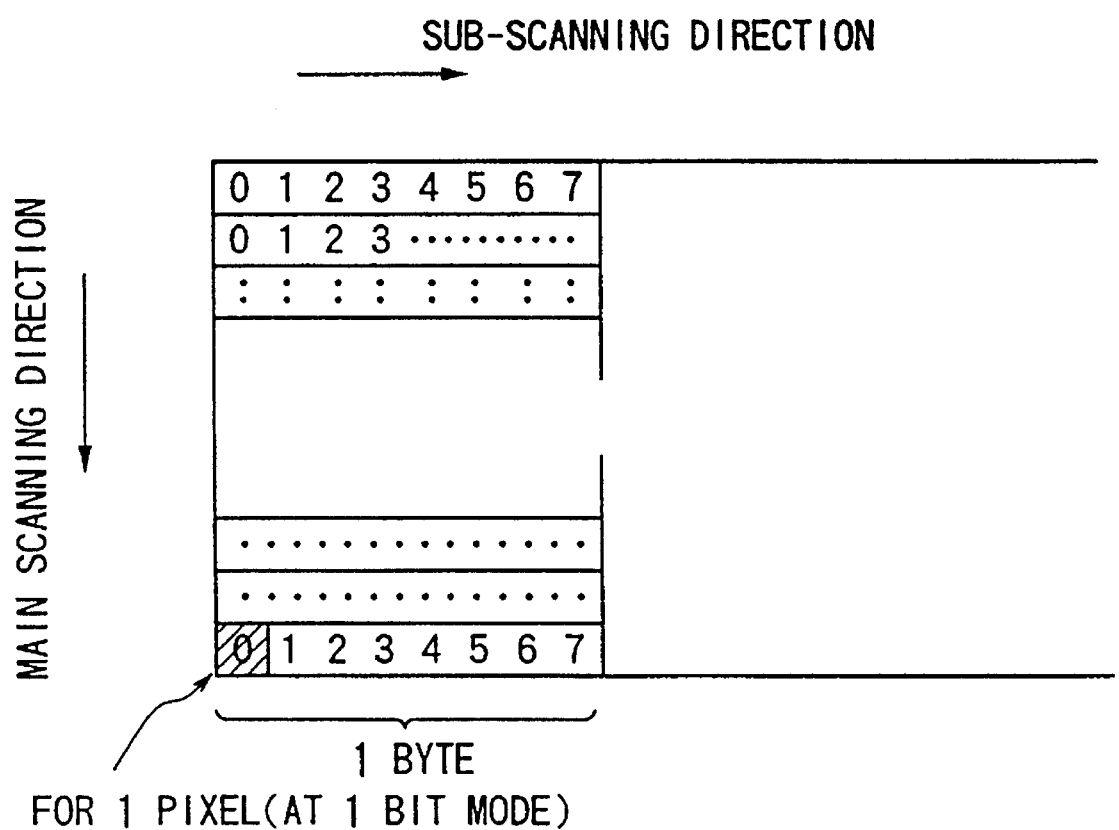
FIG. 21 illustrates a pallet.

FIG. 21 illustrates the pallet from which R, G and B data is obtained in accordance with data 0 to 7 in a case where the pallet is the 8-bit data. In a case of the 4-bit pallet, data for R, G and b are obtained in accordance with data 0 to 3 in one Hsync and data 4 to 7 in next Hsync. Therefore, in a case of one bit, a determination is made whether or not R, G and B data are printed in accordance with 0-bit data in 1 Hsync. In next Hsync, a determination is made whether or not printing is performed by using data for the first bit. The thus-constituted control portion serves as a pallet data control portion from which data is, by a pallet data generating portion, transmitted to be converted into data for R, G and B or C, M, Y and Bk in accordance with the code. Furthermore, the timing is converted before they are subjected as described above so as to be transmitted.

Finally, binary data accommodated in the memory is, by the MPX shift register, subjected to a reverse operation to that arranged for the data input portion so as to be converted into binary data in a parallel 8-bit manner. Binarized data is combined with one bit of the 8 bits so as to be timing-converted before it is transferred to a magnification varying interpolation process. Since binary data is combined with one bit of the 8 bits, data becomes abnormal if it is subjected to the interpolation process. Therefore, data is simply increased at this time. Then, the through process is performed in the masking and the log & γ conversion portions before information is transmitted to output A.

Figure 22:
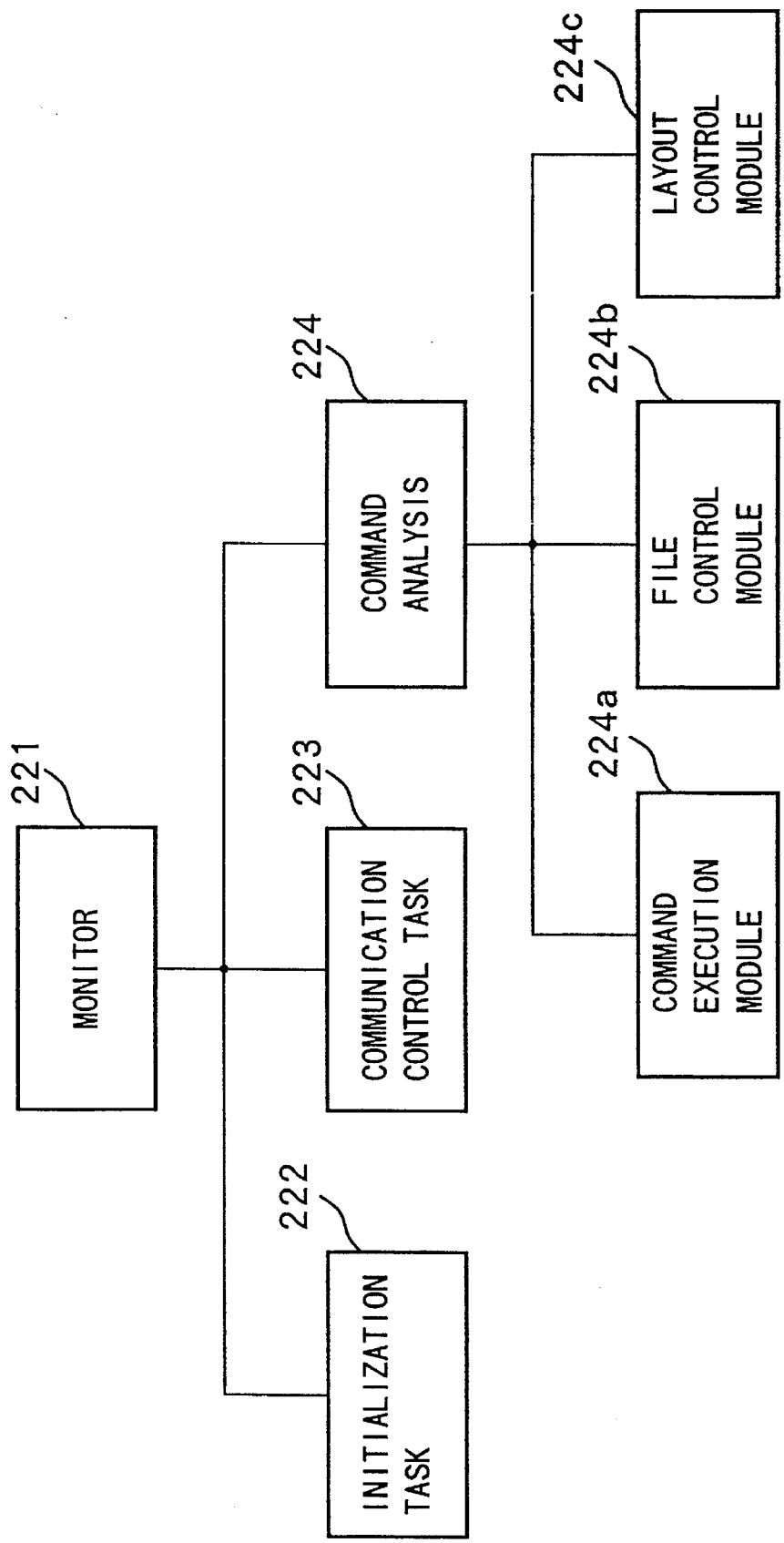
FIG. 22 illustrates the structure of software for realizing an interface function with a host computer.

FIG. 22 illustrates the structure of software realizing an interface function with the host computer (omitted from illustration).

Reference numeral 221 represents a monitor task for administrating lower tasks (222 to 224). Reference numeral 222 represents an initializing task which is started when power is supplied (at the time of resetting) so as to variously initialize both software and hardware. Reference numeral 223 represents a communication control task for performing processes relating to the GP-IB or SCSI interface controller or image data transmission/reception. A command analyzing task 224 separates command columns transmitted, in the ASCII system, from the host computer into command nnemonic and its auxiliary parameter so that processes relating to the command analysis such as the format validity check is performed.

Reference numeral 224a represents a command execution module for executing processes which correspond to the various commands, the command execution module 224a being composed of a plurality of execution modules. The interface according to this embodiment is capable of registering a plurality of image data items on the frame memory, image data thus-registered being used as a file. A file administrating module 224b is a module for administrating information about the above-described image file in such a manner that it administrates information relating to the file attribute, for example, the file name, the pixel size, the image type and the registered logical address; performs the file operation such as the file registration, elimination and the file name change; and the frame memory allocation administration in accordance with the file operation. A plurality of the registered images can be transmitted to arbitrary positions with arbitrary size in accordance with a command issued from the host computer. A layout administrating module 224c administrates information about the output positional coordinate of each image file and the output size.

A variety of interface functions are realized by software thus-constituted, the interface functions being classified into the following two sorts of modes depending upon the state of use of the frame memory.

(1) Buffer Memory Mode

In this mode, the frame memory is used as a buffer region for transferring an image between the interface and the host computer. Furthermore, the image is not registered on the frame memory and the number of the image to be processed is limited to one. In this mode, the following functions acting depending upon the direction in which image data is transferred are possessed:

(1)-1: Host Computer→Interface→Printer

Image data to be held/administrated by the host computer is transmitted via the interface. At this time, the output image can be subjected to the following operation in accordance with a command issued from the host computer:

Instruction of output size (automatic magnification variation, automatic individual magnification variation and enlargement ratio)

Instruction of output position (coordinate)

Selection of output sheet

Instruction of number of outputs (1)-2: Scanner→Interface→Host Computer

Image obtained by reading and transmitted from the scanner portion is transferred to the host computer via the interface. At this time, the following operations can be performed in accordance with a command issued from the host computer.

Instruction of the region from which the original document is read

Instruction of the size of image to be read (automatic magnification variation, individual magnification variation and magnification ratio)

(2) Image Registration Mode

In this mode, the frame memory is used as a memory for registering images such as an image transferred from the host computer and an image read by the scanner. The registered image is administrated as a file by the above-described file administrating module 224b. A plurality of images can be registered. In this mode, the following functions acting depending upon the direction in which image data is transferred are possessed:

(2)-1: Host Computer→Interface→Frame Memory

Image data held/administrated by the host computer is transferred so as to be registered to the frame memory. At this time, the following factors are instructed in accordance with commands issued from the host computer.

Image size

Image file name (2)-2: Scanner→Frame Memory

An image read from the scanner is registered to the frame memory. At this time, the following factors are instructed in accordance with commands issued from the host computer:

Region from which the original document is read

Ratio of magnifying the image to be read (automatic magnification variation, automatic individual magnification variation and magnification variation ratio)

Name of image to be registered (2)-3: Registered Image Output

Image data registered in the frame memory can be transmitted to the printer or transferred to the host computer in accordance with an instruction issued from the host computer.

(2)-3-1: Printer Output

Registered image data is transmitted by the printer to the frame memory instructed by the host computer. At this time, the following functions are realized in accordance with instructions issued from the host computer.

1. Enlarged Image Output

By instructing the following factors in accordance with commands issued from the host computer image data registered to the frame memory is transmitted after it has been enlarged:

Image file name to be transmitted

Image output position (coordinate)

Output size (Automatic magnification variation, automatic individual magnification variation, enlargement ratio)

Output sheet

Number of output sheets

2. Repeated Outputs

By instructing the following factors in accordance with commands issued from the host computer, plurality of image data items registered to the frame memory is repeatedly transmitted in the longitudinal and lateral directions of the output sheet:

Name of image file to be transmitted

Number of repetitions in each of directions X and Y

Output size (automatic magnification variation, automatic individual magnification variation and enlargement ratio)

Output sheet

Number of output sheets

3. Layout Output

By issuing the following instructions to a plurality of image files from the host computer, the printer layout of a plurality of image data items registered to the frame memory is made:

Image output position (coordinate)

Output size (automatic magnification variation, automatic individual magnification variation, enlargement ratio)

Output sheet

Number of output sheets

4. Synthesis with Scanner Image

By instructing the following factors in accordance with commands issued from the host computer, an image read by the scanner from the scanner original document frame and the image registered to the frame memory are synthesized and transmitted:

Scanner image synthesizing mode

Region from which the original document is read

Size of image to be read (automatic magnification variation, automatic individual magnification variation and magnification variation ratio)

Output sheet

Number of output sheets

At this time, it can be combined with the repeated output and/or the layout output (2)-3-2: Transference to Host Computer Image data registered to the frame memory instructed by the host computer is transferred to the host computer. At this time, the size of image transferred becomes that instructed at the time of the registration to the frame memory.

In addition to the above-described functions, the following additional functions are provided:

(1) Addition of Registered Image

Another image file can be added to a portion within the image region of the image file registered to the frame memory. At this time, the following factors are instructed by the host computer:

Subject image files

Image addition position

Size of image to be added (2) Cutting of Registered Image

A portion of the image region of an image file registered in the frame memory is cut so as to transfer it to the host computer. At this time, the following factors are instructed from the host computer:

Subject image file

Image cutting position

Size to be cut (3) The image registered to the frame memory is rotated in units of 90° so as to be transmitted to the printer. At this time, the following factors are instructed by the host computer:

Subject image file

Rotational angle (4) A mirror Image

A mirror image of the image registered to the frame memory is transmitted to the printer. At this time, the following factors are instructed by the host computer:

Subject image file

Furthermore, the following image processes can be performed by utilizing the frame memory as the work memory for processing the image:

Character synthesis

Mosaic process

Texture process

[Other Embodiments]

Figure 23:
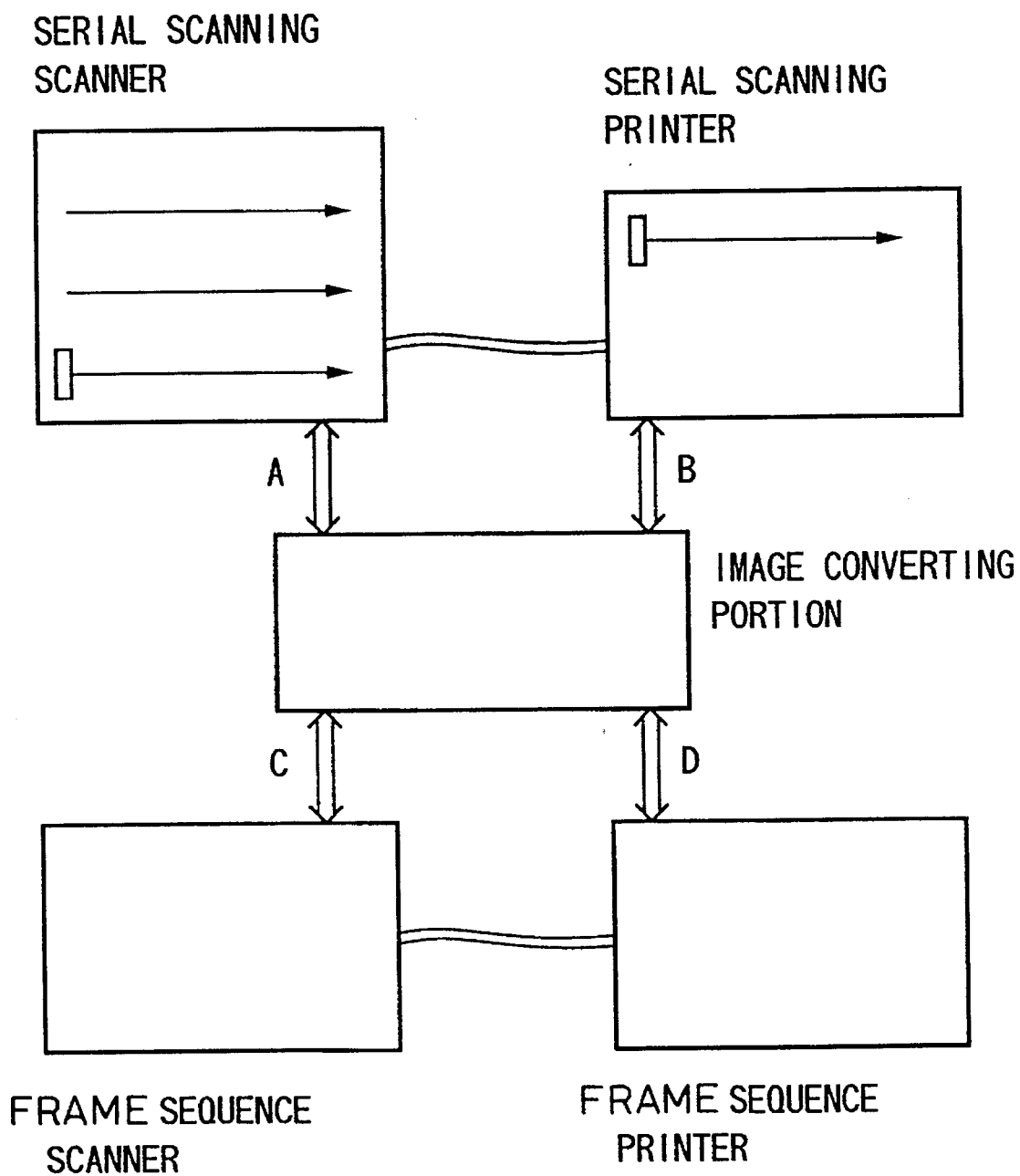
FIG. 23 illustrates a connection established between different kind equipment according to another embodiment of the present invention.

Referring to FIG. 23, a connection between different type equipment will now be described, wherein a device the reading method and the printing method are different is attached to the structure according to the above-described embodiment. According to this embodiment, the above-described connection is established in such a manner that information for distinguishing the junction process, the memory accommodation method and the writing method is communicated with the control portion of the memory by a communication which is established in such a manner that a command is supplied to a portion of the sequential communication line for communicating each status. FIG. 23 illustrates a combination composed by a serial scanner, a serial scanning printer, a frame sequential scanner, a frame sequential printer. However, all of the above-described units are not required to be connected wit the image converting portion according to the present invention. A combination may be employed in which a scanner and a multiplicity of sorts of printers are combined. Furthermore, another combination may be employed in which a multiplicity of kinds of scanners and a single printer are combined.

The image converting portion first confirms the connection before commencing the communication in accordance with the precedence order. Although the precedence order may be determined freely, the sequential order A, B, C and D shown in FIG. 23 is employed here. First, the image converting portion confirms the connection established among A to D before commences a communication with A. As a result, it confirms A is a serial scanning type scanner. Then, a communication with B is performed, resulting a confirmation to be made that B is a serial scanning type printer. Similarly, the type of each of A to D is discriminated.

There are four types of reading and print-out systems A→B, A→D, C→B and C→D. In the case of A→B is the same arrangement as that according to the above-described embodiment. Since the arrangement A→D does not require the junction process, the junction portion is deleted similarly to the process performed in the case of A→B. Furthermore, reading from A is performed before the address is controlled and the output is made in such a manner that printing can be performed by a scanning method adapted to the plane by coinciding the color order because D is a plane sequence printer. In the case of C→B, there is no junction because reading of the plane is performed. Therefore, the plane read is accommodated in the memory. Then, when an output to B is performed, the address control is performed by collecting the significant pixels+the portion of the junction while making coincidence with the scanning operation. In the case of C→D, the output of the content read may be performed as it is since the two units are the plane sequential units. Therefore, it can be performed by performing outputting as made when the accommodation in the memory is carried out. As described above, the method is discriminated and the fact whether or not there is a junction is discriminated and the memory address control is performed so that the different type units can be connected to one another.

Although the width which can be read by the scanner and that to be printed are arranged to be 256 according to this embodiment, the present invention is not limited to this. For example, it may be arranged to 512 or another arbitrary numeral.

As described above, the mechanism for reading a portion of image data in an overlap manner is provided which acts when image data transmitted from an image reading device is stored to the frame memory and when overlap image data is deleted before image data is stored and image data is transmitted from the frame memory to the image forming device. Therefore, image quality deterioration such as the formation of lines can be prevented which take place in the binarizing process or the spatial filter process in a case where a variety of image editing operations or transmission/receipt of image data to and from a host computer is performed in a structure in which a frame memory is disposed in a serial scanning type image copying device. As a result, a high quality image can be obtained.

According to this embodiment, writing can be performed while deleting the overlap portion at the time of the writing operation by performing the memory writing address and reading address operations. Furthermore, reading is performed including the overlap portion. However, the present invention is not limited to this. For example, the above-described address operation may be eliminated to perform the above-described process. Furthermore, the overlap process may be performed in only either the writing operation or the reading operation.

According to the present invention, a multi-function image processing apparatus with which the deterioration in the image quality can be prevented can be provided.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

We claim:

1. An image processing apparatus comprising:

generating means for generating serial-scanned image data representing a whole image, said image data having an overlap portion in a subscanning direction and having a predetermined width;

image processing means for performing image processing on a pixel of interest in said image data by using image data for pixels adjacent to the pixel of interest, said image data for pixels adjacent to the pixel of interest comprising image data from said overlap portion in a case where the pixel of interest is adjacent to said overlap portion; and writing means for writing said image data processed by said image processing means into a memory so that said overlap portion is deleted and the whole image is stored in said memory.

2. The image processing apparatus according to claim 1, wherein said generating means comprises an image scanner.

3. The image processing apparatus according to claim 2, wherein said image scanner is a color image scanner.

4. The image processing apparatus according to claim 1, wherein said overlap portion is a portion for a spatial filtering process.

5. The image processing apparatus according to claim 1, wherein said overlap portion is a portion for a binarizing process.

6. The image processing apparatus according to claim 1, wherein said writing means stores only significant pixel data into said memory according to a signal outputted in relation to said significant pixel.

7. The image processing apparatus according to claim 1, further comprising printing means for printing the record data.

8. The image processing apparatus according to claim 7, wherein said printing means discharges a liquid through film boiling created by heat energy.

9. An image processing apparatus comprising:

generating means for generating serial-scanned image data representing a whole image, said image data having an overlap portion in a subscanning direction and having a first predetermined width;

image processing means for performing image processing on a pixel of interest in said image data by using image data for pixels adjacent to the pixel of interest, said image data for pixels adjacent to the pixel of interest comprising image data from said overlap portion in a case where the pixel of interest is adjacent to said overlap portion;

writing means for writing said image data processed by said image processing means into a memory so that said overlap portion is deleted and the whole image is stored in said memory;

reading means for reading image data of a second predetermined width from said memory in which the whole image is stored, at least a part of said read image data being overlapped in a subscanning direction when said image data was generated by serial scanning; and processing means for processing said read image data to obtain record data to be used in recording.

10. The image processing apparatus according to claim 9, further comprising printing means for printing the record data.

11. The image processing apparatus according to claim 10, wherein said printing means discharges a liquid through film boiling created by heat energy.

12. The image processing apparatus according to claim 9, wherein said processing means executes a spatial filtering process.

13. The image processing apparatus according to claim 12, wherein said overlap portion is a portion for a spatial filtering process.

14. The image processing apparatus according to claim 9, wherein said processing means includes binarizing processing means.

15. The image processing apparatus according to claim 14, wherein said overlap portion is a portion for a binarizing process.

16. An image processing apparatus comprising:

generating means for generating serial-scanned image data;

processing means for processing the image data obtained from said generating means to obtain record data to be used in a recording, wherein said generating means is adapted to generate overlapping image data for an area neighboring an object area to be processed by said processing means, and wherein said processing means performs image processing on a pixel of interest in the image data by using image data for pixels adjacent to the pixel of interest, the image data for pixels adjacent to the pixel of interest comprising image data from the overlapping image data in a case where the pixel of interest is adjacent to the overlapping image data; and writing means for writing the image data processed by said processing means into a memory so that the overlapping image data is deleted.

17. The image processing apparatus according to claim 16, wherein said generating means comprises an image scanner.

18. The image processing apparatus according to claim 17, wherein said image scanner is a color image scanner.

19. The image processing apparatus according to claim 16, further comprising printing means for printing the record data.

20. The image processing apparatus according to claim 19, wherein said printing means performs printing in an ink-jet manner.

21. The image processing apparatus according to claim 16, wherein said processing means executes a spatial filtering process.

22. The image processing apparatus according to claim 16, wherein said processing means includes binarizing processing means.

23. The image processing apparatus according to claim 22, wherein said binarizing processing means performs quantization processing of the image data to obtain binary data as the record data in an error dispersion method.

* * * * *

UNITED STATES PATENT AND TRADEMARK OFFICE
CERTIFICATE OF CORRECTION

PATENT NO. : 5,592,304

DATED : January 7, 1997

INVENTORS : Udagawa et al.

It is certified that error appears in the above-identified patent and that said Letters Patent is hereby corrected as shown below:

COLUMN 3:

Line 17, "other" should be deleted.

COLUMN 5:

Line 22, "so-called a GPIB" should read --so-called GPIB--; and
Line 37, "respective" should read --respectively--.

COLUMN 6:

Line 6, "as well as they" should read --also--.

COLUMN 7:

Line 53, "corresponding the quantity" should read --corresponding quantity--.

COLUMN 8:

Line 59, "and as well as" should read --and--; and
Line 66, ", the" should read --, the scanning of the--.

COLUMN 9:

Line 22, "and as well as" should read --and--.

UNITED STATES PATENT AND TRADEMARK OFFICE
CERTIFICATE OF CORRECTION

PATENT NO. : 5,592,304

DATED : January 7, 1997

INVENTORS : Udagawa et al.

It is certified that error appears in the above-identified patent and that said Letters Patent is hereby corrected as shown below:

COLUMN 10:

Line 14, "has the opening" should read --has an opening--; and
Line 16, "be" should be deleted.

COLUMN 11:

Line 14, "por tion" should read --portion--;
Lines 48 and 49, "off set" should read --offset--;
Line 60, "off set" should read --offset--;
Line 61, "off set" should read --offset--;
Line 62, "(bin" should read --(b1--;
Line 64, "off set" should read --offset--; and
Line 66, "off set" should read --offset--.

COLUMN 12:

Line 5, "change" should read --changing--.

COLUMN 13:

Line 34, "for" should be deleted, and "shortage" should read --shortage of--.

UNITED STATES PATENT AND TRADEMARK OFFICE
CERTIFICATE OF CORRECTION

PATENT NO. : 5,592,304

DATED : January 7, 1997

INVENTORS : Udagawa et al.

Page 3 of 4

It is certified that error appears in the above-identified patent and that said Letters Patent is hereby corrected as shown below:

COLUMN 15:

Line 44, "(k7ks...ko)" should read --(k7k6...ko)--;
Line 50, "and as well as" should read --and--; and
Line 61, "set" should read --sent--.

COLUMN 17:

Line 19, "B" should read --A--.

COLUMN 19:

Line 17, "as well as" should read --also--;
Line 25, "b" should read --B--; and
Line 62, "nnemonic" should read --mnemonic--.

COLUMN 20:

Line 29, "possessed" should read --performed--.

UNITED STATES PATENT AND TRADEMARK OFFICE
CERTIFICATE OF CORRECTION

PATENT NO. : 5,592,304

DATED : January 7, 1997

INVENTORS : Udagawa et al.

It is certified that error appears in the above-identified patent and that said Letters Patent is hereby corrected as shown below:

COLUMN 22:

Line 48, "device" should read --device in which--; and
Line 62, "wit" should read --with--.

Signed and Sealed this

Second Day of September, 1997

Attest:

BRUCE LEHMAN

Attesting Officer

Commissioner of Patents and Trademarks